United States Patent
Pujare et al.

(10) Patent No.: US 9,992,152 B2
(45) Date of Patent: *Jun. 5, 2018

(54) HUB BASED CLEARING HOUSE FOR INTEROPERABILITY OF DISTINCT UNIFIED COMMUNICATIONS SYSTEMS

(71) Applicant: NextPlane, Inc., Sunnyvale, CA (US)

(72) Inventors: Sanjay M. Pujare, San Jose, CA (US); Saravanan Bellan, San Jose, CA (US); Silvia Restelli, San Jose, CA (US); Yogesh Raina, Santa Clara, CA (US); Farzin Khatib Shahidi, Los Altos Hills, CA (US)

(73) Assignee: Nextplane, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/792,393

(22) Filed: Jul. 6, 2015

(65) Prior Publication Data
US 2016/0006683 A1  Jan. 7, 2016

Related U.S. Application Data

(63) Continuation of application No. 13/077,710, filed on Mar. 31, 2011, now Pat. No. 9,077,726.

(51) Int. Cl.
*H04L 12/58* (2006.01)
*H04L 29/06* (2006.01)
(Continued)

(52) U.S. Cl.
CPC ............ *H04L 51/36* (2013.01); *H04L 51/066* (2013.01); *H04L 63/104* (2013.01);
(Continued)

(58) Field of Classification Search
CPC .... H04L 12/5835; H04L 29/06; H04L 51/066
See application file for complete search history.

(56) References Cited

U.S. PATENT DOCUMENTS

| 6,041,281 A | 3/2000 | Nimura et al. |
| 6,065,016 A | 5/2000 | Stuntebeck et al. |

(Continued)

FOREIGN PATENT DOCUMENTS

| EP | 1549024 | 6/2005 |
| WO | WO2002039237 | 5/2002 |

OTHER PUBLICATIONS

Bossoli, Francesca, et al.; "Proposal for Common Interoperability Protocol", Online, Aug. 30, 2003, pp. 1-3, XP002283230.
(Continued)

*Primary Examiner* — Ranodhi Serrao
(74) *Attorney, Agent, or Firm* — Steptoe & Johnson LLP

(57) ABSTRACT

A hub-based clearing house for interoperability of distinct unified communication systems is disclosed. According to one embodiment, a system comprises a database that stores configuration information for the system; an administrator module that maintains the configuration information; a federation server that is connected to a first unified communications system and a second unified communications system. The federation server comprises a first translator that translates a first formatted message received from the first unified communications system into a common language formatted message, a second translator that translates the common language formatted message into a second formatted message, and a routing engine that routes the second formatted message to the second unified communications system.

25 Claims, 17 Drawing Sheets

(51) Int. Cl.
*H04L 29/08* (2006.01)
*H04L 29/12* (2006.01)

(52) U.S. Cl.
CPC ........ *H04L 65/103* (2013.01); *H04L 65/1006* (2013.01); *H04L 67/06* (2013.01); *H04L 69/08* (2013.01); *H04L 61/2575* (2013.01); *H04L 61/2589* (2013.01)

(56) References Cited

U.S. PATENT DOCUMENTS

| | | |
|---|---|---|
| 6,208,986 B1 | 3/2001 | Schneck et al. |
| 6,298,128 B1 | 10/2001 | Ramey et al. |
| 6,418,200 B1 | 7/2002 | Ciccolella |
| 6,463,056 B1 | 10/2002 | Silva et al. |
| 6,591,291 B1 | 7/2003 | Gabber et al. |
| 6,654,759 B1 | 11/2003 | Brunet et al. |
| 6,665,378 B1 | 12/2003 | Spielman et al. |
| 6,738,462 B1 | 5/2004 | Brunson |
| 6,892,245 B1 | 5/2005 | Crump et al. |
| 7,051,114 B1 | 5/2006 | Ravishankar et al. |
| 7,443,961 B2 | 10/2008 | Schroeder et al. |
| 7,558,827 B2 | 7/2009 | Kawashima et al. |
| 7,577,132 B2 | 8/2009 | Katz et al. |
| 7,697,924 B2 | 4/2010 | Caspi et al. |
| 7,698,398 B1 | 4/2010 | Lai |
| 7,706,266 B2 | 4/2010 | Plamondon |
| 7,739,333 B2 | 6/2010 | Serr et al. |
| 7,953,979 B2 | 5/2011 | Borneman et al. |
| 8,359,357 B2 | 1/2013 | Rodriguez et al. |
| 8,380,661 B2 | 2/2013 | Richards et al. |
| 2002/0037074 A1 | 3/2002 | Dowens et al. |
| 2002/0083183 A1 | 6/2002 | Pujare et al. |
| 2002/0087704 A1 | 7/2002 | Chesnais et al. |
| 2002/0124057 A1 | 9/2002 | Besprosvan |
| 2002/0157089 A1 | 10/2002 | Patel et al. |
| 2003/0018725 A1 | 1/2003 | Turner et al. |
| 2003/0149781 A1 | 8/2003 | Yared et al. |
| 2004/0083297 A1 | 4/2004 | Gazzetta et al. |
| 2005/0022006 A1 | 1/2005 | Bass et al. |
| 2005/0047438 A1 | 3/2005 | Sylvain |
| 2005/0175021 A1 | 8/2005 | Ozugur et al. |
| 2005/0288961 A1 | 12/2005 | Tabrizi |
| 2006/0021017 A1 | 1/2006 | Hinton et al. |
| 2006/0021019 A1 | 1/2006 | Hinton et al. |
| 2006/0128409 A1 | 6/2006 | Gress et al. |
| 2006/0136990 A1 | 6/2006 | Hinton et al. |
| 2006/0230124 A1 | 10/2006 | Belfiore et al. |
| 2007/0011245 A1 | 1/2007 | Kawashima et al. |
| 2007/0130343 A1 | 6/2007 | Pardo-Blazquez et al. |
| 2007/0136603 A1 | 6/2007 | Kuecuekyan |
| 2007/0202897 A1 | 8/2007 | Smith |
| 2007/0285503 A1 | 12/2007 | Asthana et al. |
| 2008/0010665 A1 | 1/2008 | Hinton et al. |
| 2008/0021997 A1 | 1/2008 | Hinton |
| 2008/0072301 A1 | 3/2008 | Chia et al. |
| 2008/0082662 A1 | 4/2008 | Dandliker et al. |
| 2008/0086564 A1 | 4/2008 | Putman et al. |
| 2008/0144896 A1 | 6/2008 | Burke |
| 2008/0215694 A1 | 9/2008 | Chen et al. |
| 2008/0215717 A1 | 9/2008 | Zhou et al. |
| 2008/0320576 A1 | 12/2008 | Curling |
| 2009/0019115 A1 | 1/2009 | Larson et al. |
| 2009/0019367 A1 | 1/2009 | Cavagnari et al. |
| 2009/0049190 A1 | 2/2009 | Jiang et al. |
| 2009/0077251 A1 | 3/2009 | Brown et al. |
| 2009/0089625 A1 | 4/2009 | Kannappan et al. |
| 2009/0094336 A1 | 4/2009 | Echevarria et al. |
| 2009/0119763 A1 | 5/2009 | Park et al. |
| 2009/0138615 A1 | 5/2009 | Cristallo et al. |
| 2009/0150905 A1 | 6/2009 | Lin et al. |
| 2009/0172776 A1 | 7/2009 | Makagon et al. |
| 2009/0177735 A1 | 7/2009 | Algie et al. |
| 2009/0180602 A1 | 7/2009 | Ramanathan et al. |
| 2009/0276840 A1 | 11/2009 | Cao et al. |
| 2009/0292814 A1 | 11/2009 | Ting et al. |
| 2009/0307327 A1 | 12/2009 | Malik et al. |
| 2009/0319672 A1 | 12/2009 | Reisman |
| 2009/0327868 A1 | 12/2009 | Tsukikawa |
| 2010/0017598 A1 | 1/2010 | Rodriguez et al. |
| 2010/0057851 A1 | 3/2010 | Ionescu et al. |
| 2010/0058120 A1 | 3/2010 | Coleman et al. |
| 2010/0100925 A1 | 4/2010 | Hinton |
| 2010/0162374 A1 | 6/2010 | Nair |
| 2010/0205664 A1 | 8/2010 | Serr et al. |
| 2010/0251158 A1 | 9/2010 | Geppert et al. |
| 2010/0287226 A1 | 11/2010 | Wright et al. |
| 2010/0290611 A1 | 11/2010 | Ramanathan et al. |
| 2011/0035443 A1 | 2/2011 | Jensen |
| 2011/0231473 A1 | 9/2011 | Narayanan et al. |
| 2011/0231919 A1 | 9/2011 | Vangpat et al. |
| 2011/0314014 A1 | 12/2011 | Junginger et al. |
| 2012/0008753 A1 | 1/2012 | Burnett et al. |
| 2012/0084254 A1 | 4/2012 | Richards et al. |
| 2012/0180105 A1 | 7/2012 | Downes et al. |
| 2012/0185391 A1 | 7/2012 | Sirota |
| 2012/0190325 A1 | 7/2012 | Abu-Hakima et al. |
| 2012/0216267 A1 | 8/2012 | Austel et al. |
| 2012/0254326 A1 | 10/2012 | Bellan et al. |
| 2012/0254373 A1 | 10/2012 | Pujare et al. |
| 2013/0007150 A1 | 1/2013 | Hertz et al. |
| 2013/0132285 A1 | 5/2013 | Richards et al. |
| 2013/0151709 A1 | 6/2013 | Luna |
| 2013/0160105 A1 | 6/2013 | Huang et al. |
| 2013/0198386 A1 | 8/2013 | Srikanth et al. |
| 2013/0246640 A1 | 9/2013 | Ahrens |
| 2013/0268920 A1 | 10/2013 | Ursal et al. |
| 2014/0148934 A1 | 5/2014 | Manley et al. |
| 2014/0280931 A1 | 9/2014 | Braun et al. |
| 2014/0280932 A1 | 9/2014 | Braun et al. |
| 2014/0282934 A1 | 9/2014 | Miasnik et al. |
| 2014/0337954 A1 | 11/2014 | Ahmed et al. |
| 2015/0039700 A1 | 2/2015 | West et al. |

OTHER PUBLICATIONS

"Nimsoft® Monitor™ Server, Getting Started Guide version 6.00" (Jun. 29, 2012 to Nimsoft), 46 pages.

"Office-LinX Cloud Connect Edition for Cisco Unity Connection", Esna Technologies, Inc., Richmond Hill, ON, Canada © 2012, 2 pages.

Levy, Brian, "The common capability approach to new service development", BT Technology Journal, vol. 23, No. 1, Jan. 2005, pp. 48-54.

Microsoft Computer Dictionary, 5th Edition, Microsoft Press, Redmond, WA, (c) 2002, p. 16.

Microsoft Computer Dictionary, 5th Edition, Microsoft Press, Redmond, WA, (c) 2002, p. 474.

Bogusz, Dariusz, et al., "Telco 2.0 for UC—an example of integration telecommunications service provider's SDP with enterprise UC system", FedCSIS 2012, Wroclaw, Poland, Sep. 9-12, 2012, pp. 603-606.

Ennai, Anuraj, et al., "MobileSOA: A Service Oriented Web 2.0 Framework for Context-Aware, Lightweight and Flexible Mobile Applications", EDOCW 2008, Munich, Germany, Sep. 16, 2008, pp. 345-352.

Beuchelt, G., et al., "RESTful Services Guidance for Developers v 1.0", MITRE Technical Report MTR100093, Apr. 2010, 46 pages.

"Web Application Description Language", Wikipedia, downloaded from en.wikipedia.org/wiki/Web_Application_Description_Language on Feb. 2, 2015, pp. 1-3.

"Representational state transfer", Wikipedia, downloaded from en.wikipedia.org/wiki/Representational_state_transfer on Feb. 2, 2015, pp. 1-5.

"Cisco Unified Communications System Description Release 8.5(1)", Cisco Systems, Inc., San Jose, CA, (c) 2010, 90 pages.

Technical Specification "Interdomain Federation for IM and Presence Service on Cisco Unified Communications Manager, Release 9.0(1)", Cisco Systems, Inc., San Jose, CA, Jul. 18, 2012, 188 pages.

(56) References Cited

OTHER PUBLICATIONS

"Chapter 21—Voice Messaging", Cisco Unififed Communications System Description—Release 9.0 SRND, Cisco Systems, Inc., San Jose, CA, Apr. 30, 2013, 44 pages.
Supplementary European Search Report dated Aug. 20, 2014 in corresponding EP Application No. EP 11862613 filed Apr. 26, 2011, inventor Pujare, Sanjay et al.
PCT International Search Report dated Oct. 22, 2014 in corresponding PCT Application No. PCT/US2014/041595 filed Jun. 9, 2014, inventor Pujare, Sanjay et al.
PCT International Search Report dated Jan. 2, 2015 in corresponding PCT Application No. PCT/US2014/059944 filed Oct. 9, 2014, inventor Pujare, Sanjay et al.
PCT International Search Report dated May 23, 2012 in corresponding PCT Application No. PCT/US2012/024014 filed Feb. 6, 2012, inventor Pujare, Sanjay et al.

HUB BASED CLEARING HOUSE FOR INTEROPERABILITY OF DISTINCT UNIFIED COMMUNICATIONS SYSTEMS

CROSS REFERENCE TO RELATED APPLICATIONS

The present application is a continuation of U.S. patent application Ser. No. 13/077,710 entitled "HUB BASED CLEARING HOUSE FOR INTEROPERABILITY OF DISTINCT UNIFIED COMMUNICATIONS SYSTEMS" filed on Mar. 31, 2011, which is hereby incorporated by reference.

FIELD

The present system and method relate to unified communications (UC) systems, and more particularly, to providing a highly scalable system for interconnecting distinct and independent UC systems in a federated manner.

BACKGROUND

A unified communications (UC) system generally refers to a system that provides users with an integration of communications services. Users typically connect to the UC system through a single client to access the integrated communications services. The integrated communications services may include real-time services, such as instant messaging (IM), presence notifications, telephony, and video conferencing, as well as non-real-time services, such as email, SMS, fax, and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Currently, a number of third-party developers offer various UC applications for implementing UC systems. The various applications include MICROSOFT OFFICE COMMUNICATIONS SERVER™ (OCS), IBM SAMETIME™ (ST), GOOGLE APPS™, and CISCO JABBER™. Because there is no industry standard regarding UC systems, issues of incompatibility arise when one UC system needs to communicate with a different UC system. In one case, a corporation or business that employs a particular UC system may desire to communicate externally with vendors or other persons who employ a different UC system. Or in the case of internal communication, when an organization that employs a particular UC system "A" merges with another organization that employs a UC system "B", the ability for users on system "A" to communicate with users on system "B" is often desirable. Nevertheless, the incompatibility of the UC systems often makes communication between the UC systems difficult or impossible to implement.

A system wide shift to one system can be expensive and in some cases impractical. Thus, in the past, these issues have been dealt with in a variety of ways:

1. Using multiple clients. For instance, user A would use client 1 to communicate with users on system 1 and use client 2 to communicate with users on system 2. One drawback to this system is that users who only have access to system 1 still cannot communicate with users who only have access to system 2 and vice versa.
2. Using a multi-protocol client that is capable of talking to multiple UC systems. The user still needs an account on each system.
3. Using a point federation system.
4. Switching the communication mode. That is, if IM is not possible switching to a telephone call or email.
5. Building a custom link.

However, these alternative methods are sub-optimal as they typically result in reduced usability of the UC system or in increasingly unscalable and expensive added infrastructure.

SUMMARY

A hub-based clearing house for interoperability of distinct unified communication systems is disclosed. According to one embodiment, a system comprises a database that stores configuration information for the system; an administrator module that maintains the configuration information; a federation server that is connected to a first unified communications system and a second unified communications system. The federation server comprises a first translator that translates a first formatted message received from the first unified communications system into a common language formatted message, a second translator that translates the common language formatted message into a second formatted message, and a routing engine that routes the second formatted message to the second unified communications system.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
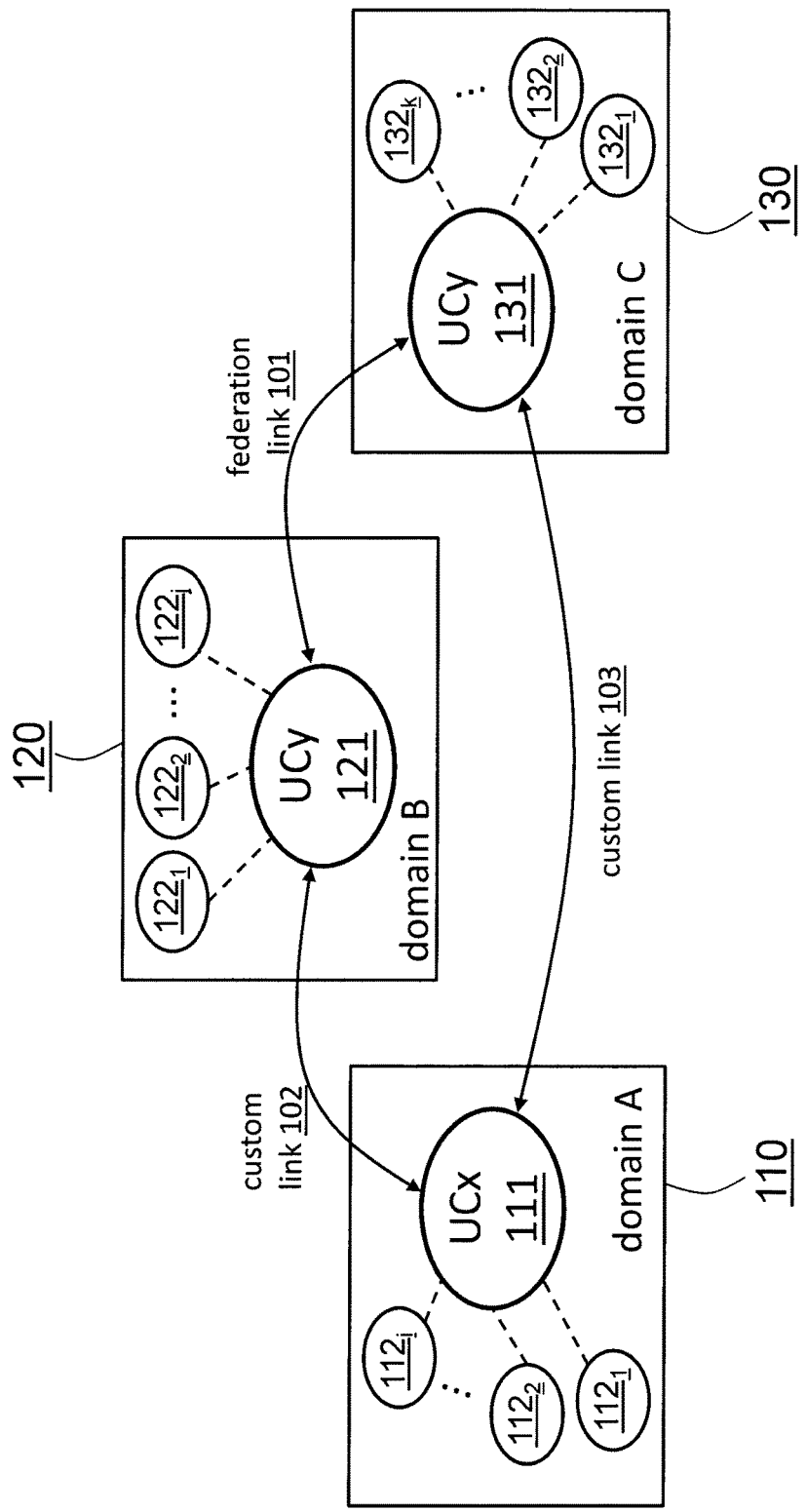
FIG. 1 illustrates a block diagram of a prior art system for interconnecting three UC systems using custom and federation links.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

Infrastructures

FIG. 1 illustrates a block diagram of a prior art system for interconnecting three UC systems using custom and federation links. UC system 111 is running the UC application denoted as "UCx" and UC systems 121 and 131 are running a different UC application denoted as "UCy". Each UC system supports a different domain and is accessible (e.g., instant messaging, emailing, video conferencing, etc.) by its respective set of users in the domain. As such, users $112_1$-$112_i$ in domain A 110 can communicate with one another through UC system 111. Similarly, users $122_1$-$122_j$ in domain B 120 and users $132_1$-$132_k$ in domain C 130 can access UC systems 121 and 131, respectively, to communicate with other users in the same domain. Because a user generally interacts with a UC system through a user client device ("client"), the terms "user" and "client" are used interchangeably in this disclosure.

Issues arise, for instance, when users in domain B 120 need to communicate with users in domain A 110 or users in domain C 130. Without a communications link between users in two different domains, the users in a domain can only communicate (through its UC system) with users in the same domain. Here, as FIG. 1 illustrates, federation link 101 provides a communications link between UC system 120 and 130. A federation link allows users in different domains to communicate with each other so long as the associated UC systems are running the same UC application. In this case, because UC systems 121 and 131 both run UC application "UCy", federation link 101 allows users $122_1$-$122_j$ to communicate with users $132_1$-$132_k$. Whether a federation link is available depends on the particular UC system.

However, where the UC systems are not running the same UC application, as between UC system 111 and UC system 121, there is typically no federation link available because a third-party developer would only provide support for its own product. Historically, one way to provide a communications link between UC systems 111 and 121 is to build a custom link 102, as FIG. 1 illustrates. Custom link 102 includes a translator that translates messages from UC system type "UCx" to UC system type "UCy" and specifically between domains 110 and 120. Because building a custom link is generally expensive in both time and resources, it is not an optimal solution.

Furthermore, custom links are not scalable. As FIG. 1 illustrates, even after a custom link 102 is implemented between domain A 110 and domain B 120, a second custom link 103 would need to be implemented in order for users in domain A 110 to communicate with users in domain C 130. Thus, implementing the infrastructure of FIG. 1 requires three unique communications links.

Figure 2:
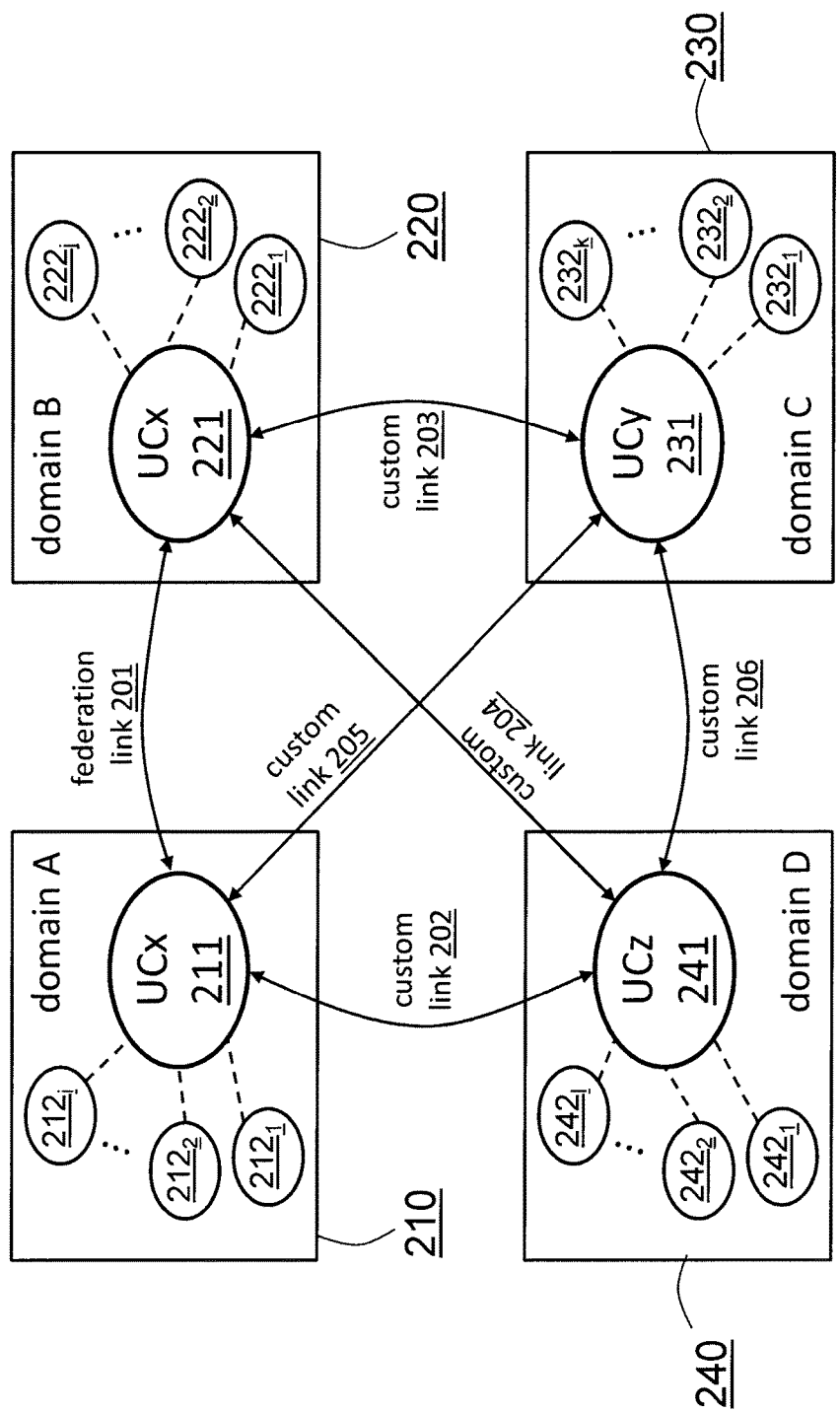
FIG. 2 illustrates a block diagram of a prior art system for interconnecting four UC systems using custom and federation links.

FIG. 2 illustrates a block diagram of a prior art system for interconnecting four UC systems using custom and federation links. As FIG. 2 illustrates, the scaling problem escalates when four UC systems in four different domains are interconnected using custom and federation links. Federation link 201 between UC systems 211 and 221 provides a communications support between users in domain A 210 and users in domain B 220. Federation link 201 is available as both associated UC systems 211 and 221 run the same UC application denoted by "UCx". Because UC systems 231 and 241 each run different UC applications (denoted by "UCy" and "UCz" respectively), the infrastructure of FIG. 2 requires implementing six unique communications links (five custom links 202-206 and one federation link 201) in order for users in any of the four domains to communicate with one another. Thus, the complexity of implementing custom links essentially doubled (from the implementation of FIG. 1 to FIG. 2) by adding just one UC system running a different UC application. As such, infrastructures that employ custom links are not scalable. There exists a need for a highly scalable system for interconnecting distinct and independent UC systems in a federated manner to provide communications support among users of the UC systems.

Figure 3:
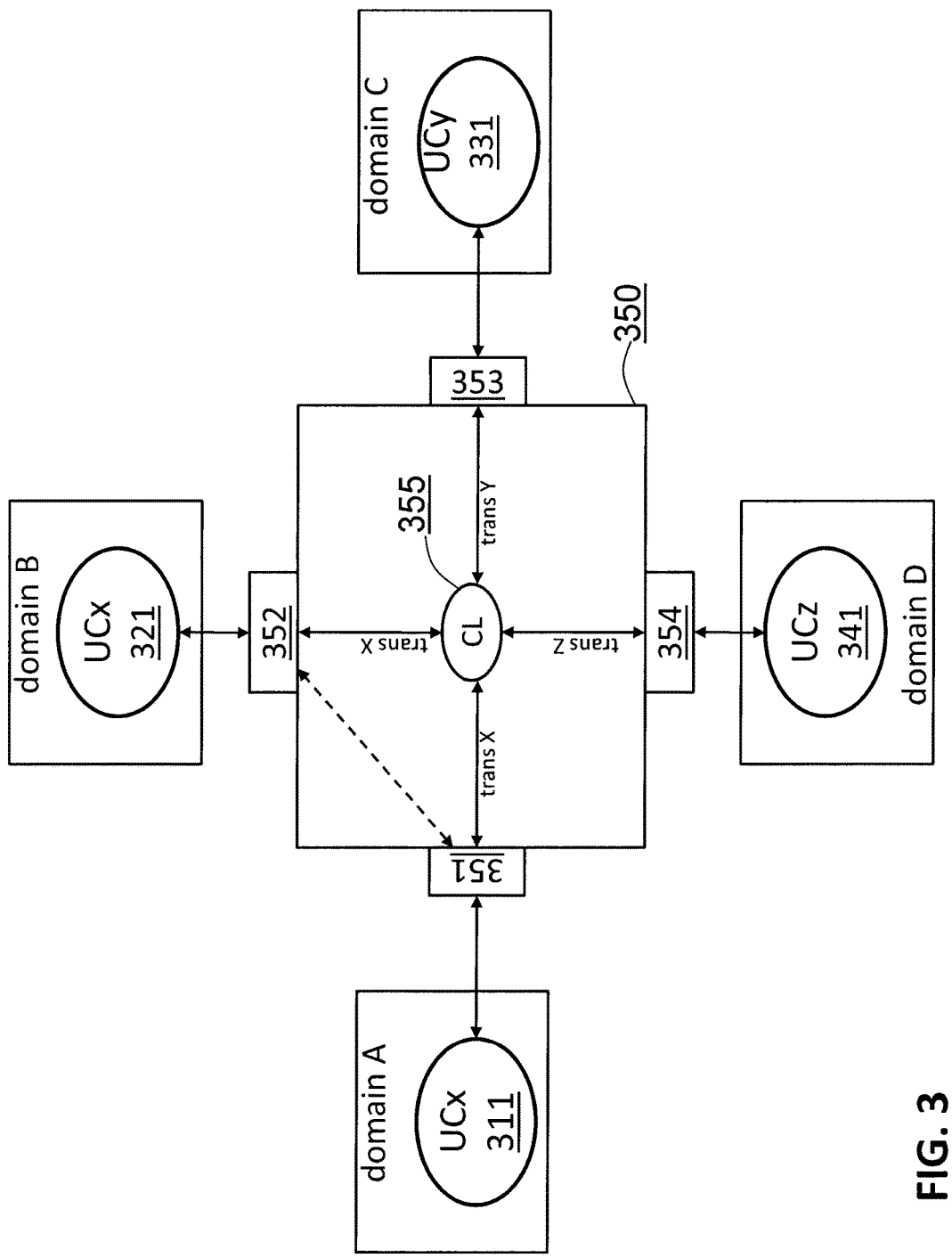
FIG. 3 illustrates a block diagram of an exemplary highly scalable system for interconnecting UC systems, according to one embodiment.

FIG. 3 illustrates a block diagram of an exemplary highly scalable system for interconnecting UC systems, according to one embodiment. While FIG. 3 only illustrates interconnecting four UC systems 311, 321, 331, and 341, the present system can interconnect and support any number of UC systems. The exemplary system of FIG. 3 employs a hub 350 that includes four connectors 351-354. Although FIG. 3 illustrates that each connector communicates with one of the four UC systems 311, 321, 331, and 341, each connector can support any number of UC systems as long as the connector and the UC systems utilize or speak the same protocol (e.g., Session Initiation Protocol (SIP), Extensible Messaging and Presence Protocol (XMPP), or any other) and are within reach of one another in terms of network connectivity. Generally, one connector per UC protocol is needed per realm. A realm is the network region that is reachable from a network interface (to which the connector is bound).

The hub 350 acts as a central station for translating incoming data from any supported UC system into a common language (CL) 355. Depending on the UC application that is implemented on the receiving UC system, the CL 355 is then translated into the language that is supported by the receiving UC system. For instance, a message that is transmitted by UC system 331 and intended for UC system 341 is first transmitted to the hub 350 via connector 353. The message is then translated by hub 350 into a CL 355. Because the message is intended for UC system 341, the CL 355 is then translated into the language that is recognized by the UC application denoted by "UCz" and transmitted to UC system 341 via connector 354.

Similarly, a message that is transmitted by UC system 321 and intended for UC system 341 is first transmitted to the hub 350 via connector 352 and then translated into a CL 355. Again, the CL 355 is then translated into the language that is recognized by the UC application denoted by "UCz" and transmitted to UC system 341 via connector 354. In the case in which two UC systems are running the same UC application, the hub may route a message sent from one UC system to the other without performing translations. As FIG. 3 further illustrates, the hub 350 may, for instance, route a message sent by UC system 311 to UC system 321 without performing translations, as indicated by the perforated line.

The hub may also perform direct translation (e.g., from "UCy" type to "UCz" type) without first translating the message into a CL. Direct translation may be used to achieve higher efficiency and to maintain high fidelity communications.

Under the exemplary embodiment of FIG. 3, each UC system thinks that it is communicating with a UC system that is running the same UC application as itself. Rather than having to maintain separate federations among each particular domain, as illustrated in FIGS. 1 and 2, a network administrator can create a clearing house community that connects multiple domains through a single hub. One advantage of the exemplary system of FIG. 3 is its scalability. For instance, consider adding to the infrastructure of FIG. 3 an additional UC system that is implemented on a new UC application and is associated with a new domain. The addition may simply be implemented by adding the functionality (a one-time job) for translating between the language used by the new UC application and the common language. Depending on the network configurations, an allow list may also need to be updated (also a one-time job) to include any existing or added domain that does not publish an SRV record (discussed more later). Once added, the new UC system would be able to communicate with any of the UC systems already connected to the hub and vice versa. In contrast, adding a new UC system to the infrastructure of FIG. 2 would require building four additional custom links (one for each of the pre-existing UC systems).

In addition to solving the scalability issues described above, the hub or clearing house system illustrated in FIG. 3 also provides for the ability to implement additional features. For instance, the present hub may provide for preservation of high fidelity communication. This disclosure contemplates employing a common language (CL) format that provides for full translation from one UC language format to another without unnecessary or unavoidable loss of information. This may be accomplished by translating the UC formatted message into a CL formatted message such that no data is discarded until the CL formatted message is translated into the UC format that is recognized by the receiving UC system. Unlike using a lowest common denominator approach to defining the CL in which all communications are lowered to the UC language format with the least common functionality, employing a CL format that provides for full translation preserves high fidelity communication between UC systems.

Consistent with one embodiment, the CL is a superset language that supports features (e.g., fields) of all supported UC language formats. For instance, the CL may contain some or all the fields of a supported UC language format. Also, the CL may be an evolving language wherein new syntax (headers) can be added to accommodate any new features that become available in supported UC systems. The new syntax may then be used by all the translators to translate a CL formatted message into a message of respective UC format that supports these new features. In one embodiment, an appropriate CL format is generic SIP.

The hub system also allows administrators to set and enforce policies by virtue of it being a hub for all inter-domain communication. When a UC system in one domain communicates directly (without going through a hub) with a UC system in another domain, administrators of each domain can only control incoming and outgoing messages locally. However, if the UC systems communicate with each other through a hub, the hub allows administrators of each UC system to access the part of the hub that applies to them so that they can administer policies that are not possible to administer locally. For instance, an administrator may administer one or more policies through the hub to allow a user in one domain to make his status appear as available to only certain members of another domain. Such granular control in setting policies is generally not available to administrators of domains interconnected using just federation and custom links.

Hub

Figure 4:
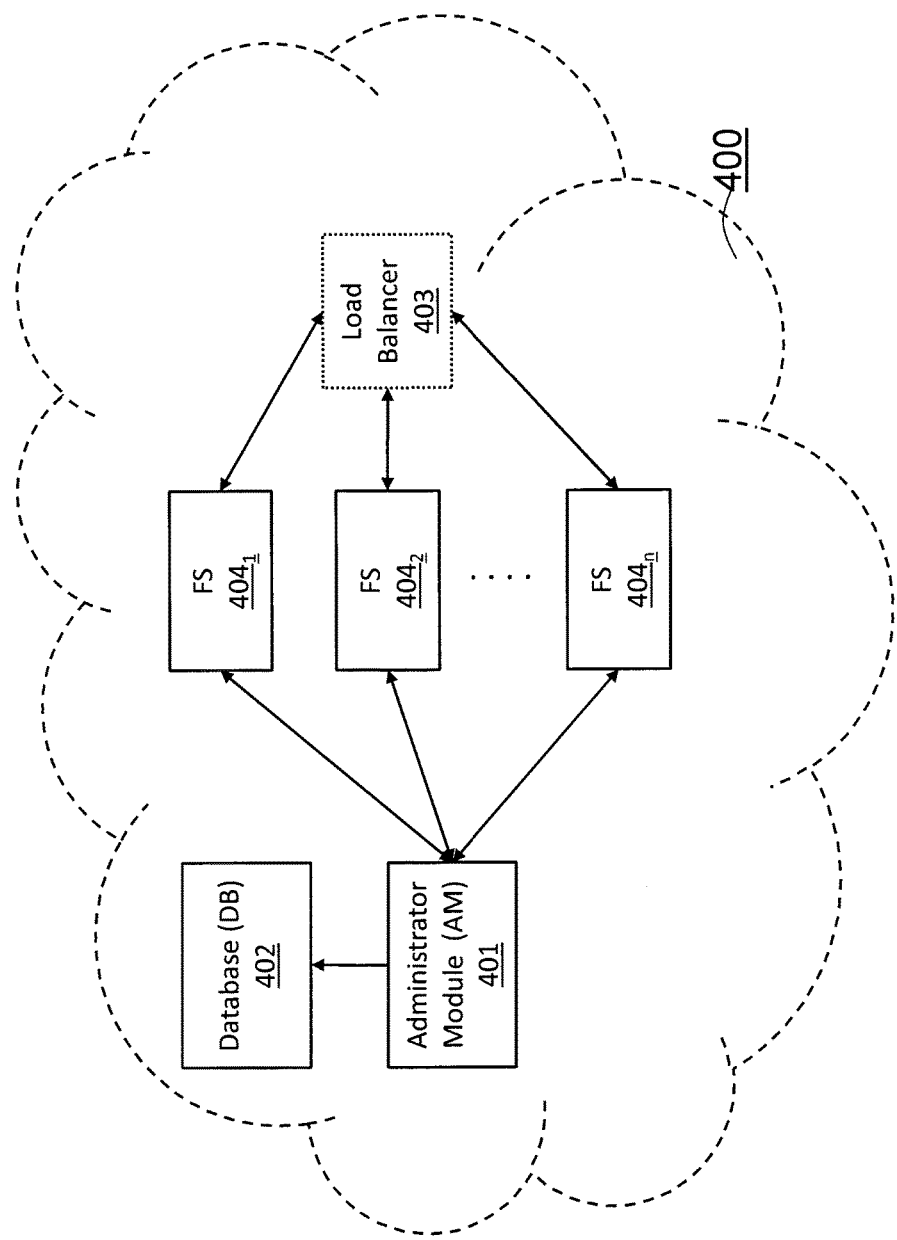
FIG. 4 illustrates a block diagram of an exemplary hub that is implemented as cloud services, according to one embodiment.

FIG. 4 illustrates a block diagram of an exemplary hub that is implemented as cloud services, according to one embodiment. That is, a hub does not necessarily run on a particular server installation or from any particular location. A hub may be broken into four main components: an administration module (AM), a database (DB), a federation server (FS), and a load balancer (LB). While a hub may be implemented using a single computer, FIG. 4 illustrates an exemplary embodiment in which the hub is implemented using several computers, each computer carrying out a specific function, and networked together to create a single installation.

Hub 400 includes an administration module implemented on computer 401. An administration module (AM) is a software program that allows hub system administrators to configure the hub to provide UC systems with access to the hub. There is typically one AM for each installation. The AM configures the hub by creating and updating a data store in a database (DB) implemented on computer 402. The data store contains the information that is used by the federation servers (FS's) to perform their functions. Each of the FS's may be implemented on separate computers $404_{1-n}$. FIG. 4 further illustrates an optional load balancer 403 that manages and directs communications traffic from UC systems to the FS's to make efficient use of the available system resources.

Some of the configurable parameters and desired settings of the AM are as follows:
 1. Administrator Settings
  a. In the administration settings the hub administrator can configure the hub to allow for public federation (e.g., allowing the hub to connect to public instant messenger systems such as Google Chat, AIM, and Yahoo Messenger).
  b. A default setting allows federation even if no policy applies to a message. This can be reversed by the administrator so that federation is allowed only if a policy applies to a message.

2. Realms
   a. A physical network card in the FS machine may be configured to support one or more connectors, one connector per protocol. A connector is created by configuring a physical network card to use a supported protocol, such as SIP or XMPP or both, and is described in further detail below.
3. Private Keys and Certificates
   a. Private and public keys may be configured within the hub so that the FS can communicate with UC systems securely. The AM allows private keys to be created for the hub by creating a self-signed key and then creating a certificate signing request which is sent to a certification authority (CA) such as Verisign or Entrust. The reply to the request is imported back into the hub, at which point, the hub can send its public certificate to all the connected UC systems.
   b. The AM acquires public certificates for all domains it would communicate with. The AM fetches the certificate for a domain present in the data store provided the hub is able to communicate over TLS with this domain.
4. Federation Servers
   a. The AM allows administrators to create, edit, and delete servers after the server has been physically built with the proper hardware. The proper settings for creating a federation server depend on the number of network cards installed on the server. Each network card may be configured to use each type of connector that is used within the realm that it is associated or may serve as a spare or may be used for other communication purposes (e.g., to DB or to the AM). A connector typically supports a single UC protocol (e.g., SIP or XMPP). However, a connector may have multiple transports configured for its UC protocol (e.g., a SIP connector configured to support SIP over TLS and SIP over TCP and an XMPP connector configured to support XMPP over TCP and XMPP over TLS).
   b. The administrator must also configure private keys and corresponding public keys and certificates so the AM can communicate internally with each FS in the installation securely. The AM and each FS communicate over TLS which requires that the AM and each FS have a private key and that the corresponding certificates (public keys) are available to the other side. This enables the AM and each FS to communicate internally over TLS.
5. Domains
   a. The following information for each domain that will be communicating through the hub are added to the database:
      i. Domain name (e.g., UC4.acme.com)
      ii. Whether the Domain is public or not
      iii. One of the following methods of acquiring the IP address is required:
         1. Use DNS SRV record to fetch the IP address
         2. Use the FQDN to fetch the IP address
         3. Input the IP Address directly
6. Policies
   a. Each policy has a name and action flags (e.g., allow, deny). There may be six types of messages that flow thru the hub: buddy invite, presence, chat, audio call, video call, and file transfer. The criteria for the policy can be specified in a structured fashion using lists and attributes of addresses involved in the address.
      i. Policy actions
         1. Buddy list invites can be allowed or denied.
            (A buddy list invite (or SUBSCRIBE as it is called in SIP/XMPP) is sent from user A to user B via the hub when user A adds user B to his contact (buddy) list)
         2. Instant Messages can be allowed or denied
         3. Presence can be allowed or denied
         4. Audio calls
         5. Video calls
         6. File transfer
      ii. Policy lists: System administrators create lists in the database which can be referenced in the policy rules. Each list may be used by the policy rules described above. The following are the types of lists that can be created by the administrators:
         1. List of Addresses
         2. List of Domains
         3. List of Groups (e.g., Using Microsoft Active Directory)
      iii. Criteria: policy criteria are specified in each policy. These criteria determine when a policy is applied to a message (specifically the source and destination addresses) being processed. Up to five criteria can be specified and each criterion applies to source, destination, both or either address in the message. The operation specified on the address(es) may be one of: is-internal, is-external, is-public, is-present-in-list or the negation of one of them.
7. Directory (For Microsoft Active Directory Functionality)
   a. Administrator can populate users and groups in the data store by having the hub connect to an active directory and download the users and groups, which eliminates duplication of data already present. Once these users and groups are downloaded, the administrator can reference them in the policies as described above.

Once the AM and the connected UC systems have been properly configured, individual users on a configured UC system can connect to other users on any other properly configured (remote or local) UC system.

As mentioned earlier, the AM configures the hub by creating and updating a data store in a database (DB) implemented on computer 402. In addition to storing configuration data received from the AM, the DB also stores data regarding local administrators (administrators of UC systems connected to the hub), local users (users in the domains of associated UC systems), and FS's. In general, because only the AM can directly manipulate data in the DB, local administrators who wish to update the DB data would have to log into the AM to do so. Local user information that may be stored in the DB include usage and audit logging information. The DB may be implemented as a relational data base.

FIG. 4 illustrates that each of the FS's may be implemented on separate computers $404_{1-n}$. The computers $404_{1-n}$ are substantially identical to one another regarding their physical hardware configurations. Each FS computer typically has three network cards installed. However, more than or less than three network cards per computer are also contemplated. Furthermore, the software applications installed on each of the computers $404_{1-n}$ are configured in almost an identical fashion to one another except that each computer is given a unique identification value.

Figure 5:
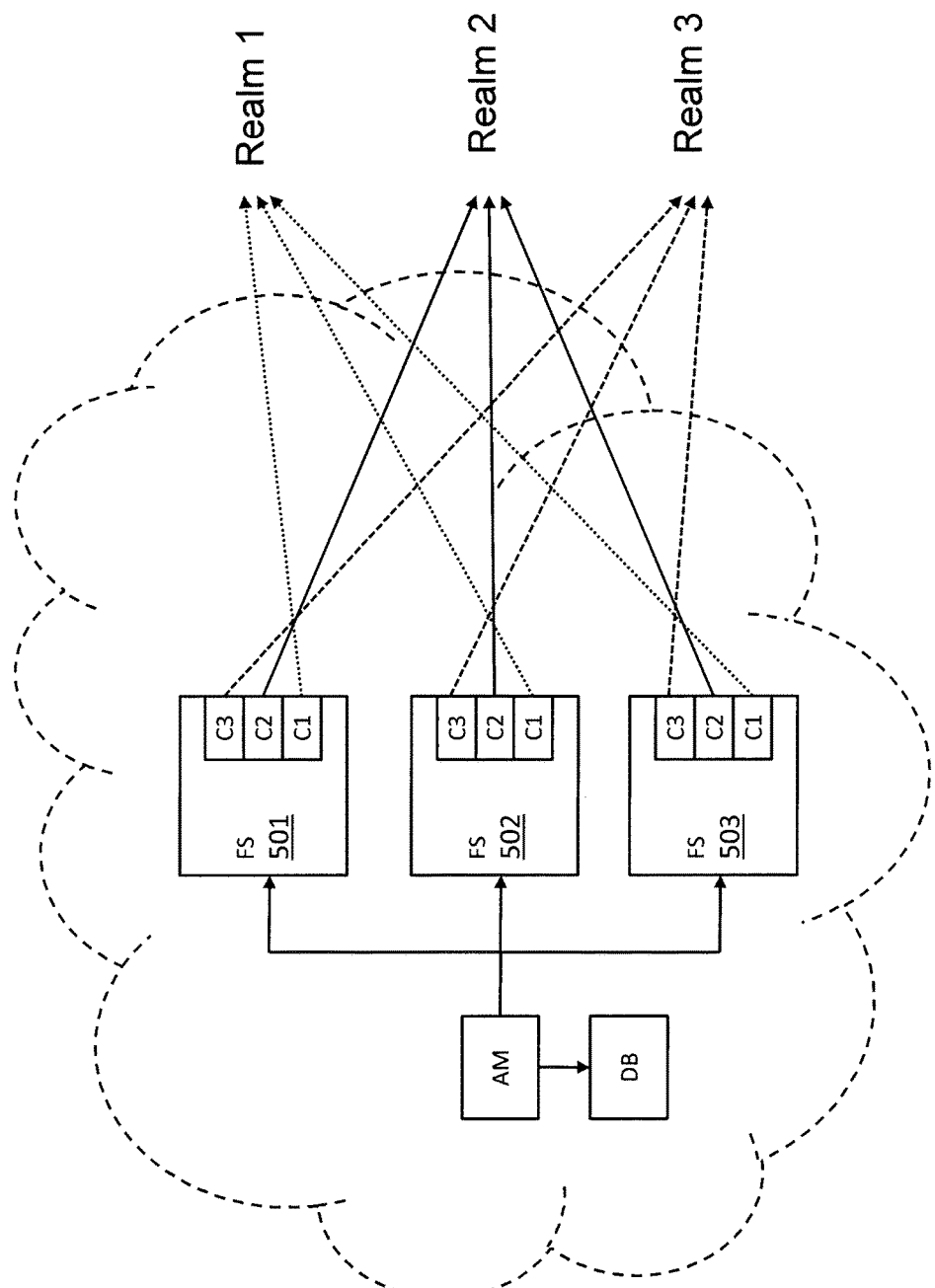
FIG. 5 illustrates a block diagram of an exemplary hub that is connected to each of three realms, according to one embodiment.

FIG. 5 illustrates a block diagram of an exemplary hub that is connected to each of three realms, according to one embodiment. Each of the computers 501-503 has three network cards (C1, C2, and C3) installed. In order for each FS to provide access to each of the three realms, each network card of a FS is connected to a different realm. A realm is a network region or network segment that is reachable through a particular network card. For instance, in an enterprise network there is often an internal network (e.g., intranet) and an external network (e.g., Internet). A computer sitting in the demilitarized zone (DMZ) of the enterprise may need a network card to access the intranet (e.g., realm 1) and another network card to access the Internet (e.g., realm 2). Any number of realms may exist. Another example of a realm is a private network that is accessible through a private link (e.g., remote branch office).

A FS has two main components: (1) instances of connectors, and (2) the DP Application Logic (herein "engine"). A connector is an object that includes both a hardware aspect and a software aspect. The hardware aspect includes a physical network card connection that provides a physical pathway for data to flow into and out of a FS machine. The software aspect of a connector, in its basic form, is comprised of (1) a listening loop that listens on the physical connection and waits for incoming data, and (2) a function that can be called by the FS when data is ready to be sent out from a network card of the FS.

Figure 6:
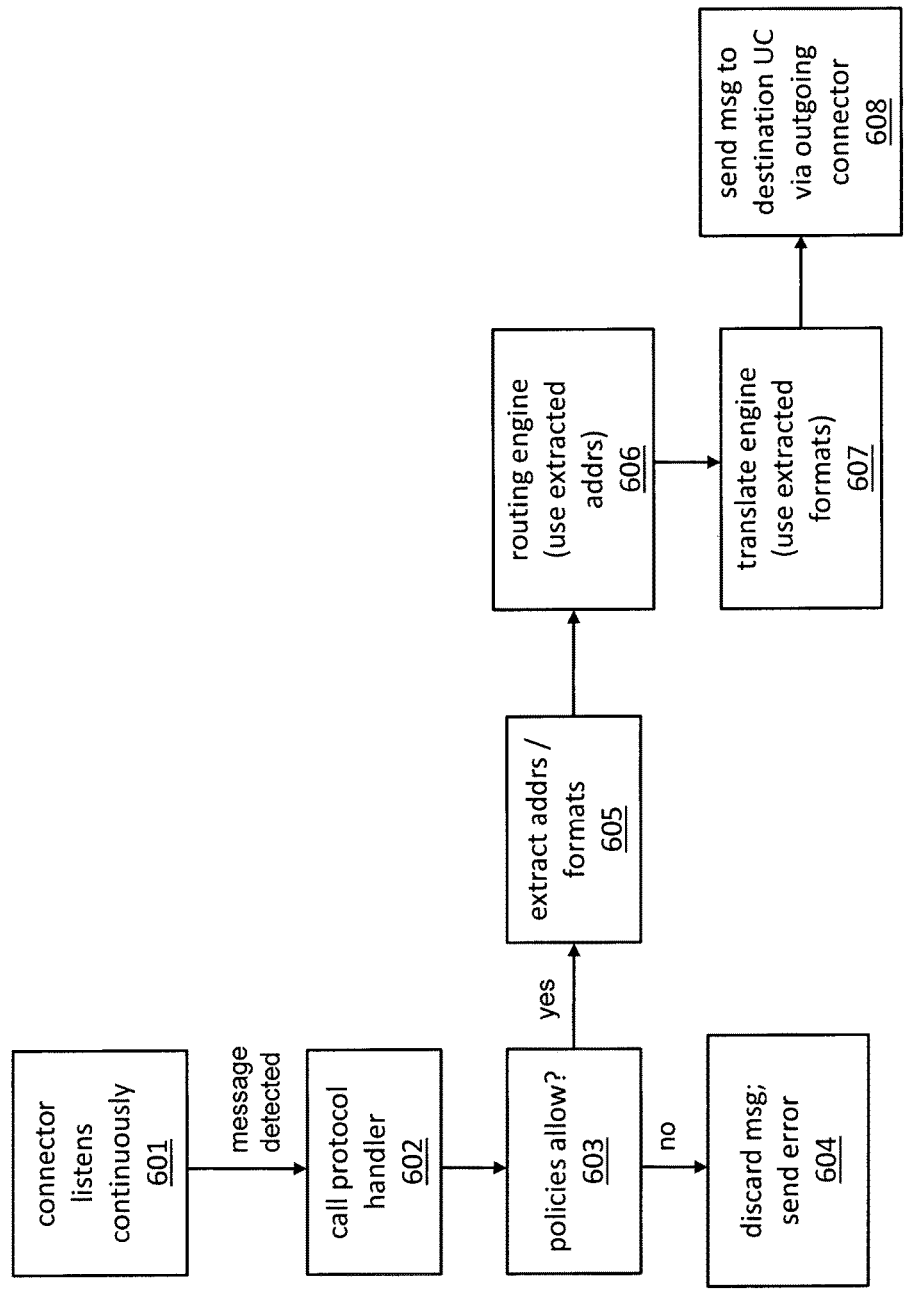
FIG. 6 illustrates a flow chart of an exemplary process for processing messages received from a UC system, according to one embodiment.

FIG. 6 illustrates a flow chart of an exemplary process for processing messages received from a UC system, according to one embodiment. The operations begin with the connectors of the FS continuously listening (at 601) for an on-the-wire message, such as a SIP or XMPP message. If a message is detected, a protocol handler is called (at 602) to translate the detected on-the-wire message into an internal memory representation of the message (IMRM). After translating into an IMRM, the hub message manager (HMM) uses a policy enforcement engine to check the IMRM against policies set up by the administrators (at 603) and decides whether the IMRM should be allowed. If the IMRM is found not to be allowed, an error message is sent back to the incoming connector which received the message and the IMRM is discarded (at 604). The error message, which may include information as to why the message was not allowed, is relayed back to the originating UC through the incoming connector. On the other hand, if the IMRM is found to be allowed, the HMM extracts the destination and source addresses as well as the destination and source UC formats from the IMRM (at 605). Using the extracted addresses, the HMM uses a routing engine to determine the destination route for the IMRM (at 606). The routing engine also adds necessary information to the IMRM to ensure the message is ready for the destination domain. For instance, the added information may include routing headers that allow SIP and XMPP outgoing connectors to route the message to the appropriate UC systems. Next, the HMM processes the IMRM using a translation engine (at 607). The translation engine first checks the data store to see if direct translation is available. If so, direct translation is used. If not, the translation engine translates the IMRM into the CL format and then translates the CL formatted message into the destination UC format. The translation engine uses the formats that were extracted at 605. After translation into the destination UC format, the message is translated into an on-the-wire format and then sent out to the destination UC system via an outgoing connector (at 608). The outgoing connector is determined by the routing engine at 606 and it uses the realm and the UC protocol of the destination UC system. Thus, connector is used for both sending and receiving messages.

Figure 7:
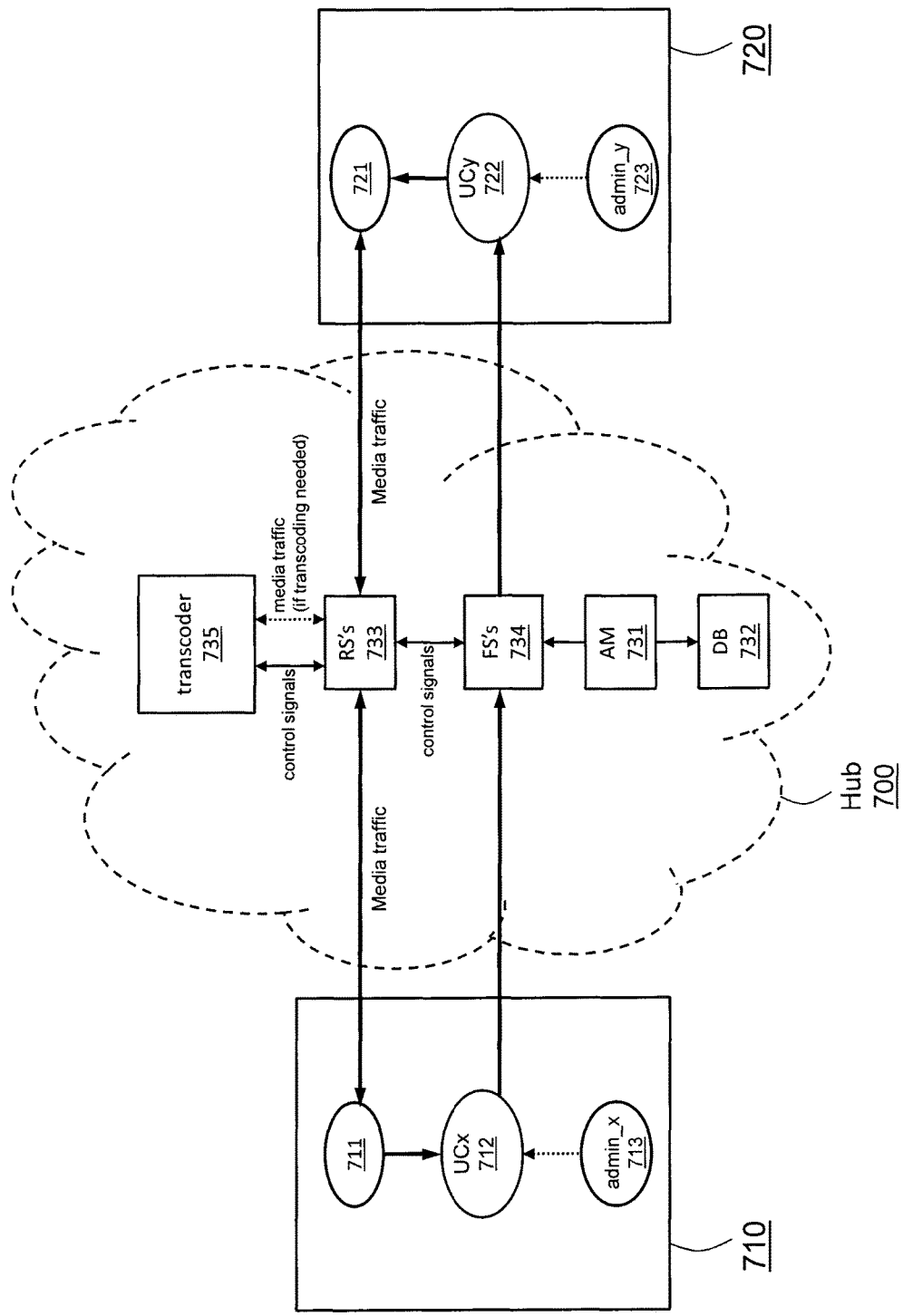
FIG. 7 illustrates a block diagram of an exemplary hub system for processing real-time media traffic such as audio and video traffic, according to one embodiment.

FIG. 7 illustrates a block diagram of an exemplary hub system for processing real-time media traffic such as audio and video traffic, according to one embodiment. As FIG. 7 illustrates, clients 711 and 721 communicate with one another through their respective UC systems 712 and 722 and hub 700. Hub 700 includes a federation server (FS) 734, a relay server (RS) 733, and a transcoder 735. While FS 734 processes messages received from UC systems (e.g., UCx 712 and UCy 722), such as illustrated in FIG. 6, RS 733 processes media traffic such as audio and video traffic between clients 711 and 721. For instance, if FS 734 determines that a media call initiate or INVITE message has been received, FS 734 sends control signals to RS 733 to engage and control certain operations of RS 733. These control signals include start-call, end-call, and caller/callee information such as media endpoint candidates and media codecs that are available. If RS 734 determines that clients 711 and 721 have at least one common media codec that is available to each client, RS 734 relays the media traffic between clients 711 and 721. The media traffic originating from client 711 would flow as follows:

client 711→RS 733→client 721

Similarly, media traffic originating from client 721 would flow as follows:

client 721→RS 733→client 711

If there is no common codec that is available to clients 711 and 721, RS 733 engages transcoder 735 to transcode the media traffic from one codec format (e.g., format used by client 711) to another codec format (e.g., format used by client 721) and vice versa. For instance, if transcoding is needed, media traffic originating from client 711 would flow as follows:

client 711→RS 733→Transcoder 735→RS 733→client 721

Similarly, media traffic originating from client 721 would flow as follows:

client 721→RS 733→Transcoder 735→RS 733→client 711

RS 733 engages transcoder 735 via control signals that, for instance, tell the transcoder 735 to set up and tear down the media endpoints (e.g., RTP and RTCP ports) that were set up at the transcoder for sending and receiving media to/from RS 733.

Although load balancers are not shown in FIG. 7, this disclosure contemplates that a load balancer may be used as an intermediary component of hub 700 for managing and directing communications traffic between UC systems 712 and 722 and FS 734. This disclosure also contemplates employing a load balancer as an intermediary component of hub 700 for managing and directing media traffic between clients 712 and 722 and RS 733. This disclosure also contemplates employing a load balancer as an intermediary component of hub 700 for managing and directing control signals traffic between transcoder 735 and RS 733. This disclosure also contemplates employing a load balancer as an intermediary component of hub 700 for managing and directing media traffic to multiple relay server nodes acting as a single logical relay server RS 733. The use of load balancers allows hub 700 to make efficient use of the available system resources and to be highly scalable.

Figure 8:
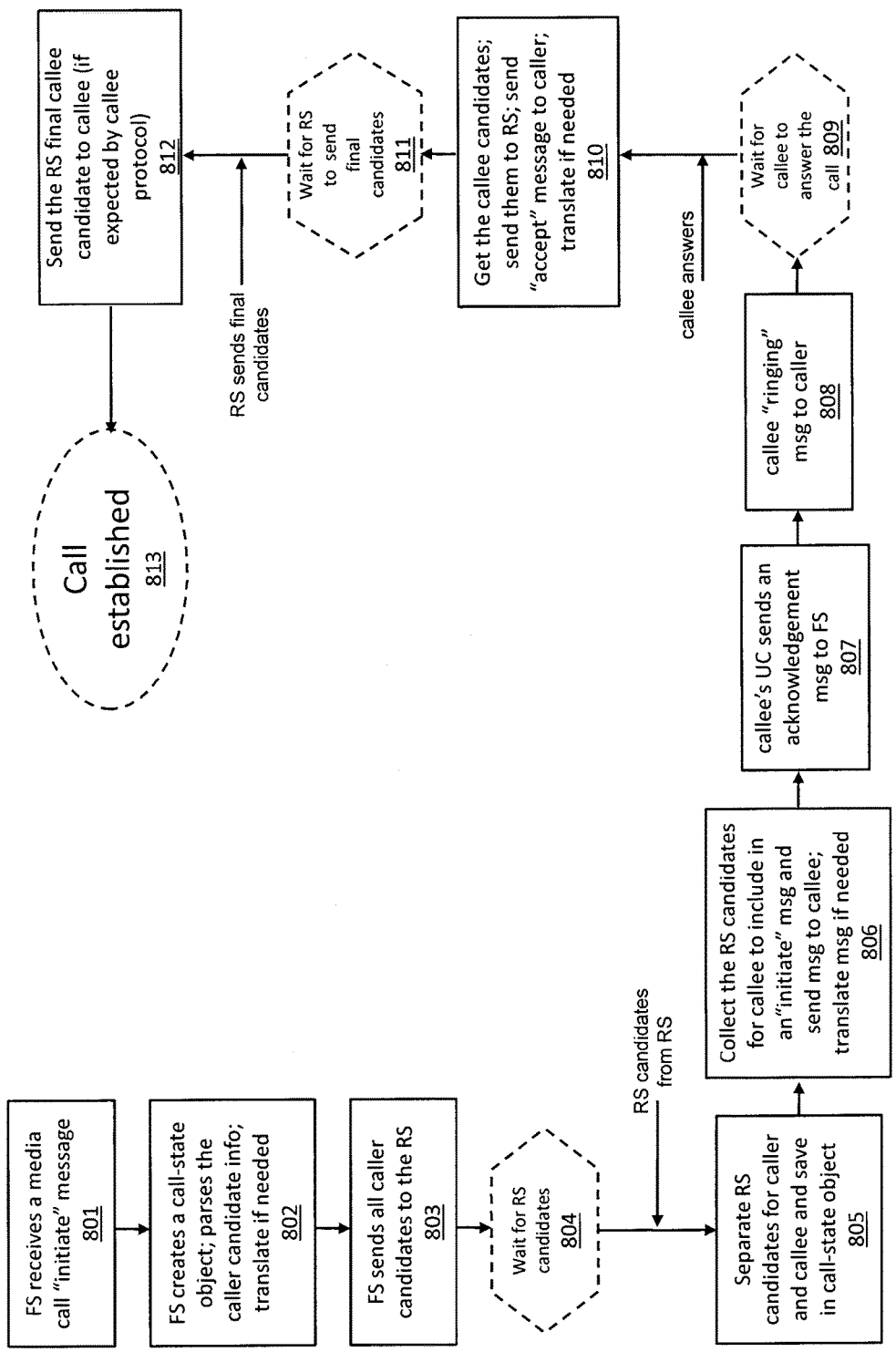
FIG. 8 illustrates a flow chart of an exemplary process for processing a media call by a federation server, according to one embodiment.

FIG. 8 illustrates a flow chart of an exemplary process for processing a media call by a federation server, according to one embodiment. The process begins (at 801) when the federation server (FS) receives a media call initiate or INVITE message from a calling client ("caller"). The initiate message may or may not include the caller candidates. Caller candidates are IP addresses and ports at which the caller can receive media traffic. If the caller candidates are not included, they may be sent in a separate message (not shown in FIG. 8). Next, the FS creates a call-state object and also parses the caller candidate information (at 802). If the caller and the intended client for receiving the call ("callee") employ different UC systems, the message may need to be translated to a common language (CL) format. A call-state object is maintained for each call started and is deleted when the call is hung up.

Next, the FS sends all caller candidates to the RS via an add-candidate message (at 803). (See FIG. 9). The FS waits for the RS to return RS candidates (at 804). RS candidates are IP addresses and ports at which the RS can receive data from clients. Because the RS receives data from both a caller and a callee, there are separate RS candidates for the caller and callee. After the FS receives the RS candidates from RS, the FS separates the RS candidates for the caller and the callee and saves them in the call-state object (at 805). Next, the FS collects the RS candidates for callee to include in an initiate message that is sent to the callee (at 806) through the callee's UC system. If the caller and the callee employ different UC systems, the message may need to be translated from a CL format to the language format that is recognized by the callee's UC system prior to being sent. Typically, a response or acknowledgement message is sent back by the callee's UC system after receiving the message (at 807). When the callee receives the initiating message, the callee sends to the caller (e.g., callee→callee UC→FS→caller UC→caller) a ringing message (at 808). Again, if the caller and the callee employ different UC systems, the message may need to be translated to an appropriate format as described earlier in this disclosure.

The FS waits for the callee to answer the call (at 809). After the callee answers the call, the FS parses the answer to obtain the callee candidates, which are then sent to the RS. Callee candidates are IP addresses and ports at which the callee can receive media traffic. The FS also sends an accept message (translated if appropriate) to the caller (at 810). The accept message signals to the caller that the callee has accepted the call. The accept message also contains the RS candidates for the caller. After receiving these RS candidates, the caller may use them to establish connectivity thru ICE negotiation, such as described in FIG. 10.

Next, the FS waits for the RS to return final candidates (at 811). Final candidates are IP addresses and ports are the best remote candidates for transferring data between the RS and the caller/callee. The FS determines the final candidates by performing ICE connectivity checks (e.g., exchanging STUN messages) with both the caller and the callee. For instance, the RS would use different pairs of callee candidates and RS callee candidates to exchange STUN messages to determine the final callee and RS callee candidates. Similarly, the RS would use different pairs of caller candidates and RS caller candidates to exchange STUN messages to determine the final caller and RS caller candidates. After the RS returns the final candidates, the FS may send the final RS callee candidate to the callee if the callee protocol expects it (at 812). Finally, the call is established (at 813).

Figure 9:
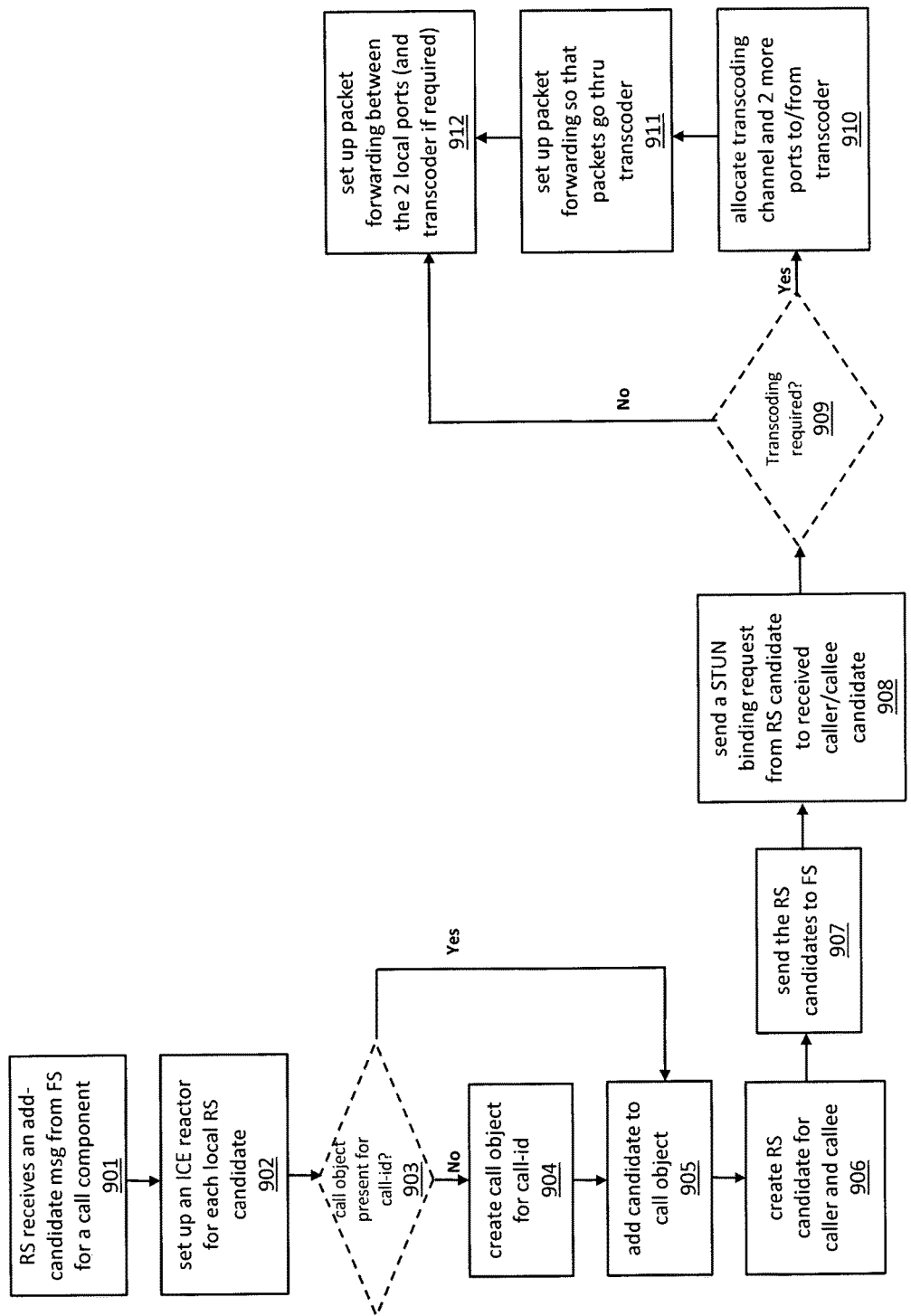
FIG. 9 illustrates a flow chart of an exemplary process employed by a relay server for adding candidates, according to one embodiment.

FIG. 9 illustrates a flow chart of an exemplary process employed by a relay server for adding candidates, according to one embodiment. The process begins when relay server (RS) receives an add-candidate message from the federation server (FS) for a call component (at 901). A call has multiple components such as audio-rtp, audio-rtcp, video-rtp and video-rtcp. Each component carries a certain aspect of media traffic. For instance, audio-rtp carries audio packets and video-rtp carries video packets. Rtcp is for control of rtp. The process applies to all components of a call. An add-candidate message is a request for the RS to return (to the FS) RS candidates for a caller and a callee and may include the following: call-id, caller address (e.g., IP address and port per candidate), callee address, and caller UC system (e.g., OCS or GTalk).

Next, the RS sets up an ICE reactor for each local RS candidate (at 902). An ICE reactor performs at least two functions. One function is to establish ICE connectivity through STUN negotiaion. After connectivity is established, a second function is to forward data packets between two peers. Next, the RS determines whether a call object is present for the call-id associated with the add-candidate message (at 903). If no call object is present, the RS creates a call object for the call-id (at 904). Next, the RS adds the candidates that are provided in the message to the call object (at 905). The RS then creates RS candidates for each of the caller and the callee (at 906) and sends them to the FS (at 907).

Next, the RS sends STUN binding requests through RS caller candidates and RS callee candidates to caller candidates and callee candidates, respectively (at 908). Next, the RS determines whether transcoding is required (at 909). Transcoding may be required if there exists no common media codec that is used by both caller and callee. If transcoding is not required, the RS sets up packet forwarding between the two local ports that have been allocated for the caller and the callee (at 912). For instance, if port A is used by the caller and port B is used by the callee, the RS forwards packets from A to B and vice versa. If transcoding is required, the RS allocates a transcoding channel and two additional ports for (e.g., port C for sending traffic to transcoder and port D for receiving traffic from transcoder) for communicating with the transcoder (at 910). The RS then sets up packet forwarding so that packets go through the transcoder (at 911). For instance, if transcoding is required, then the packet forwarding through the ports A to D would be as follows:

A→C→transcoder→D→B and vice versa.

Figure 10:
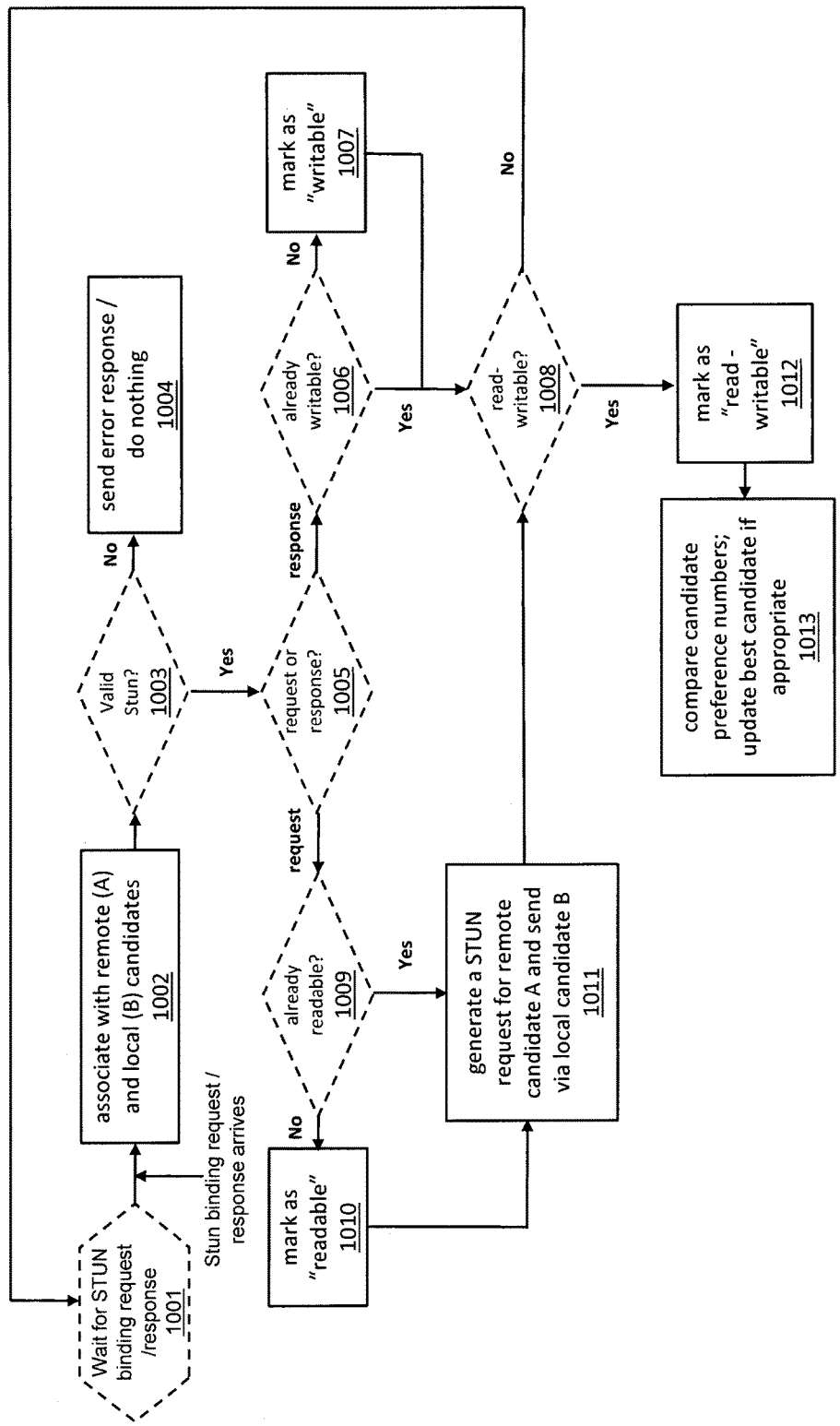
FIG. 10 illustrates a flow chart of an exemplary process employed by an ICE reactor that is part of a relay server for establishing ICE connectivity through STUN negotiation, according to one embodiment.

FIG. 10 illustrates a flow chart of an exemplary process employed by an ICE reactor for establishing ICE connectivity through STUN negotiation, according to one embodiment. An ICE reactor is set up for each local port that is allocated for a specific call. The ICE reactor ("reactor") waits for a STUN binding request/response ("STUN message") (at 1001). When a STUN message arrives to the port, the ICE reactor (or rather RS) knows which call it is for and associates it with remote (A) and local (B) candidates (at 1002). The reactor then determines whether the STUN message is valid (at 1003). The determination may be made based on industry standards, such as described in RFC5389 published by the Internet Engineering Task Force (IETF). If the STUN message is not valid, the reactor sends an error response back to the originator of the STUN message if the message is a request or does nothing if the message is a response (at 1004).

If the STUN is valid, the reactor then determines whether it is a response or a request (at 1005). If the STUN is a response, the reactor determines whether remote candidate A is already writable (at 1006). If remote candidate A is already writable, the reactor proceeds to 1008. Otherwise, the reactor marks remote candidate A as writable (at 1007) before proceeding to 1008. If the STUN is a request, the reactor determines whether remote candidate A is already readable (at 1009). If remote candidate A is already readable, the reactor proceeds to 1011. Otherwise, the reactor marks remote candidate A as readable (at 1010) before proceeding to 1011. At 1011, the reactor generates a STUN request for remote candidate A that is sent via local candidate B.

At 1008, the reactor determines whether remote candidate A is both readable and writable. If remote candidate A is both readable and writable, the reactor marks remote candidate A as read-writable (at 1012), indicating that the candidate is ready to be used for communication, before proceeding to 1013. Otherwise, the candidate is not ready to be used for communication and the reactor proceeds back to 1001. At 1013, the reactor determines whether the current candidate is preferred over the best remote candidate. For instance, the reactor may compare the current candidate's preference number with that of the best remote candidate (e.g., candidate associated with highest preference number). If the current candidate's preference number is higher than (e.g., preferred over) that of the best remote candidate, the reactor makes the current candidate the best remote candidate.

Figure 11:
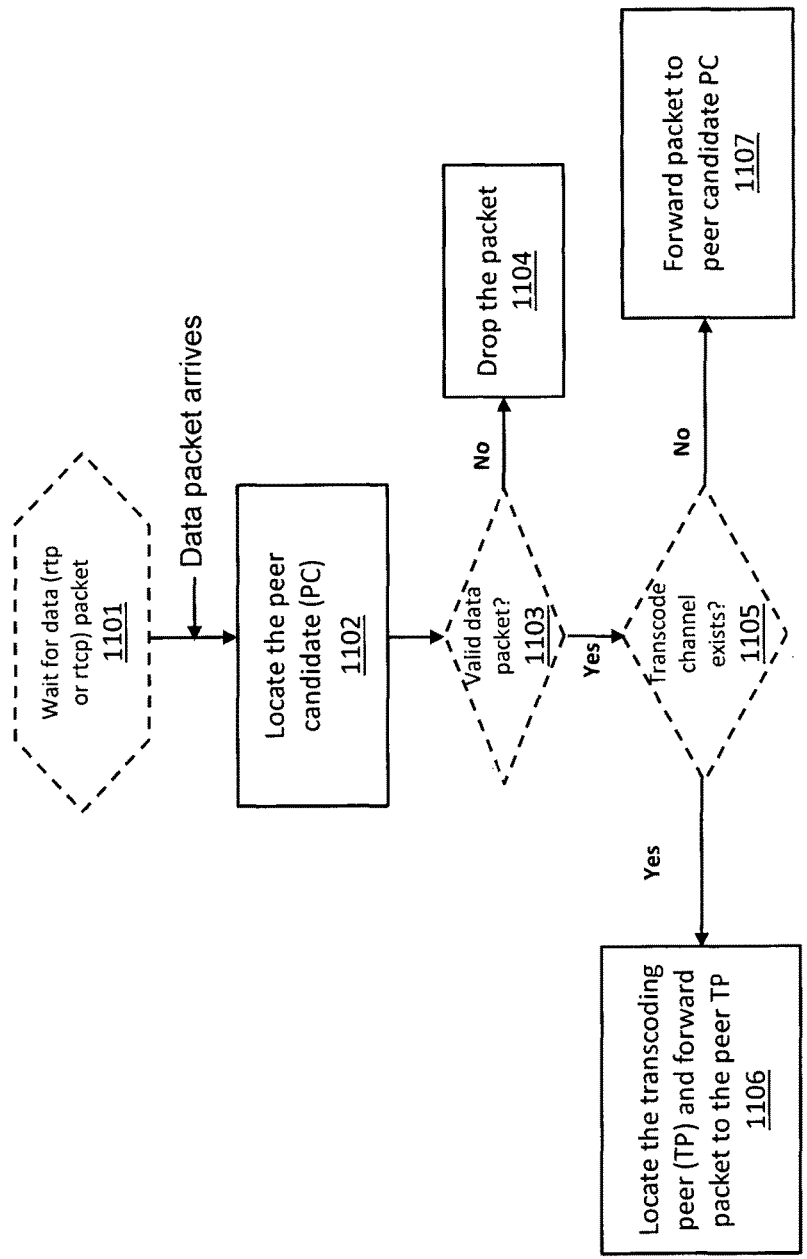
FIG. 11 illustrates a flow chart of an exemplary process employed by an ICE reactor for forwarding data packets once ICE connectivity has been established, according to one embodiment.

FIG. 11 illustrates a flow chart of an exemplary process employed by an ICE reactor for forwarding data packets once ICE connectivity has been established, according to one embodiment. The ICE reactor ("reactor") waits for data (e.g., rtp or rtcp) packets (at 1101). The ICE reactor is set up for each local port that is configured for a specific call. Once a data packet arrives at the port, the ICE reactor (or rather RS) knows which call it is for and based on that information, the ICE reactor finds the peer candidate (PC) (at 1102). Next, the reactor determines whether the data packet is valid (at 1103). The determination may be made based on industry standards regarding whether the packet is a valid rtp/rtcp packet. If the data packet is determined to be invalid, the data packet is dropped (at 1104). If the data packet is determined to be valid, the reactor then determines whether a transcode channel exists (at 1105). If a transcode channel exists, the reactor locates the transcoding peer (TP) and forwards the data packet to the peer TP (at 1106). If a transcode channel doesn't exist, the reactor forwards the data packet to the PC (at 1107).

Figure 12:
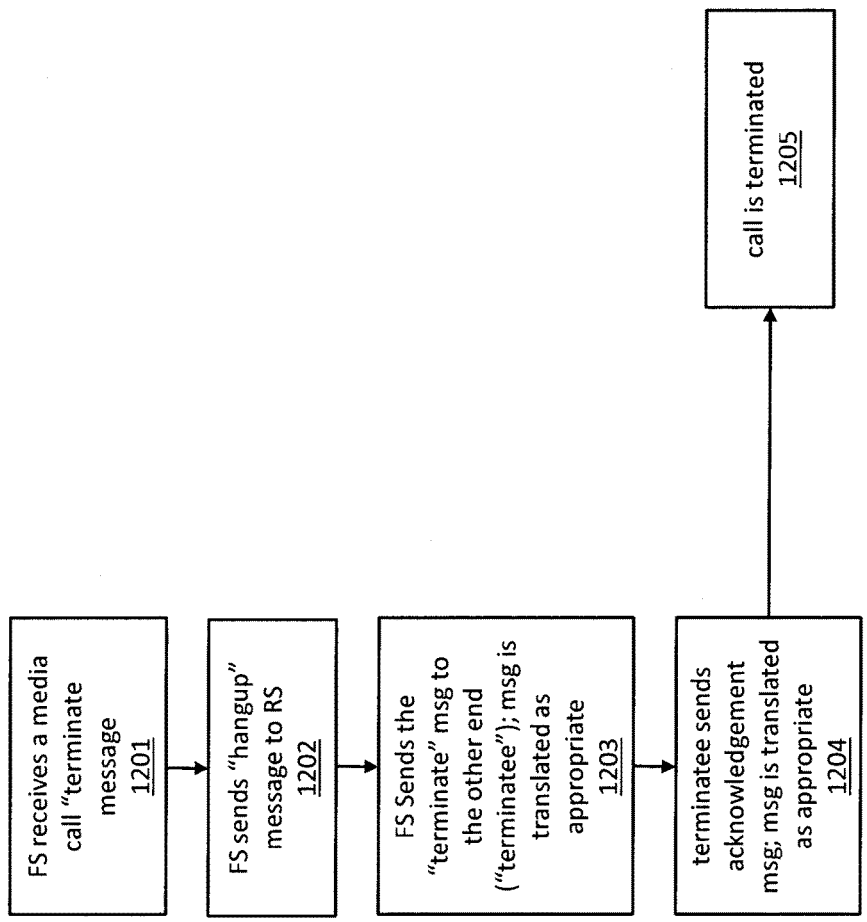
FIG. 12 illustrates a flow chart of an exemplary process employed by a federation server for terminating a media call, according to one embodiment.

FIG. 12 illustrates a flow chart of an exemplary process employed by a federation server for terminating a media call, according to one embodiment. The process begins when the federation server (FS) receives a media call terminate message from a caller or a callee ("terminator") (at 1201). In response, the FS sends a hang-up message to the relay server (RS) (at 1202). Next, the FS sends the terminate message to the "terminatee" (e.g., the other party to the call who did not originate the terminate message) (at 1203). If the terminator and the terminatee employ different UC systems, the message may need to be translated appropriately as described earlier in this disclosure (e.g., terminator UC format↔common language↔terminate format) prior to being sent. In response to the terminate message, the terminatee sends an acknowledgement message back to the terminator through the FS (at 1204). Again, appropriate translation of the message by the FS may be necessary. After receiving the acknowledgement message, the terminator finishes the call tear down sequence and the call is terminated (at 1205).

Figure 13:
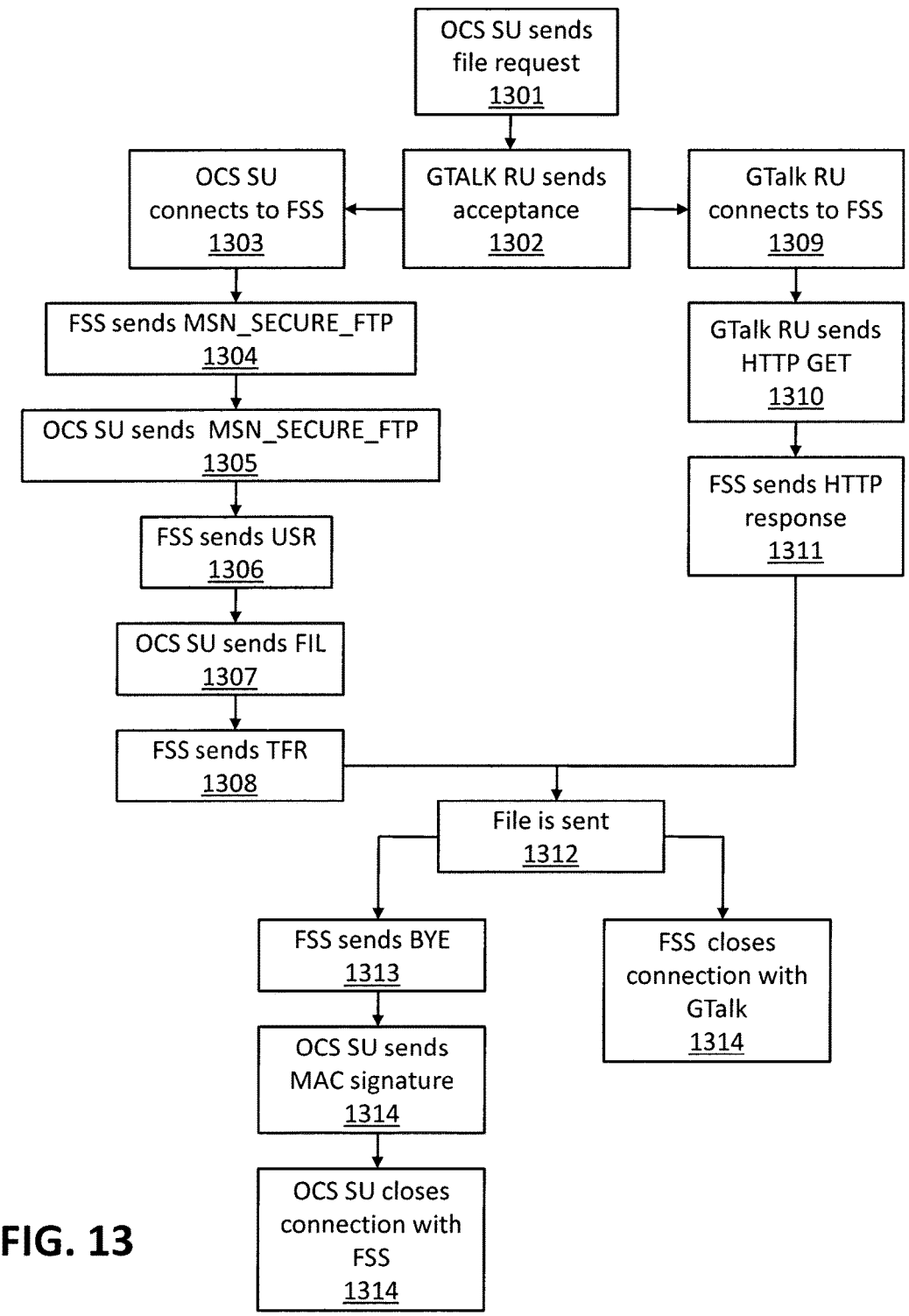
FIG. 13 illustrates a flow chart of an exemplary process for transferring a file from an OCS user to a GTalk user, according to one embodiment.

FIG. 13 illustrates a flow chart of an exemplary process for transferring a file from an OCS user to a GTalk user, according to one embodiment. File transfer is handled by a hub and a file share server (FSS) as follows. When an OCS sending user (OCS SU) wants to send a file, a request is sent to the hub (at 1301) and processed by a FS as illustrated in FIG. 6. The hub relays the request to the receiving GTalk user (GTalk RU). Once the GTalk RU accepts the request, an acceptance message is sent back through the hub to the OCS SU (at 1302). The acceptance message is again processed by a FS as illustrated in FIG. 6. Next, both the OCS SU and the GTalk RU connect to the FSS via TCP (at 1303 and 1309, respectively). TCP is the common protocol over which UC specific protocols such as TFTP and HTTP are implemented.

After OCS SU connects successfully to the FSS, the FSS sends to the OCS SU a signal indicating the protocol that will be used (e.g., VER MSN_SECURE_FTP) (at 1304). The OCS SU replies to the FSS with the same string indicating the protocol (at 1305). After GTalk RU connects successfully to the FSS, the GTalk RU sends to the FSS an HTTP GET to request the file (at 1310). In response, the FSS sends an HTTP Response (at 1311).

The FSS sends the OCS SU a USR signal for authentication (at 1306). If the USR signal is valid, the OCS SU sends back to the FSS a FIL signal that indicates the file size (at 1307). Next, the FSS sends a TFR signal to the OCS SU (at 1308). Next, the OCS SU sends the file to the FSS while the FSS sends the file to the GTalk RU (at 1312). Because the FSS knows the file size, the FSS knows when a file has finished transferring and sends a BYE signal to the OCS SU indicating a complete transfer (at 1313). Next, the OCS SU sends a MAC signature to the FSS to check the transfer (at 1314). Finally, the OCS SU closes the connection with the FSS (at 1315) and the FSS closes the connection with the GTalk RU (at 1316).

Figure 14:
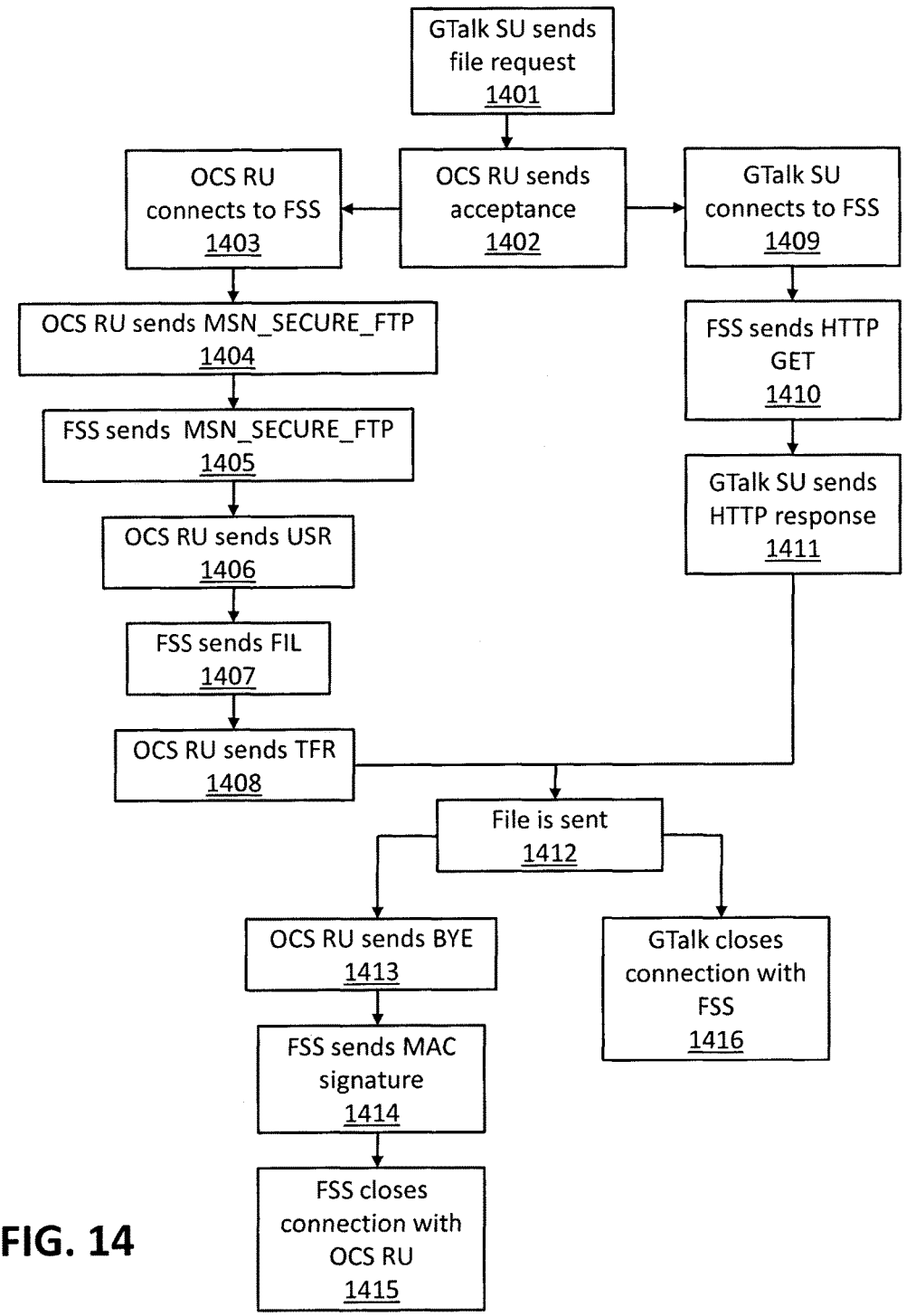
FIG. 14 illustrates a flow chart of an exemplary process for transferring a file from an GTalk user to an OCS user, according to one embodiment.

FIG. 14 illustrates a flow chart of an exemplary process for transferring a file from an GTalk user to an OCS user, according to one embodiment. File transfer is handled by a hub and a file share server (FSS) as follows. When a GTalk sending user (GTalk SU) wants to send a file, a request is sent to the hub (at 1401) and processed by a FS as illustrated in FIG. 6. The hub relays the request to the receiving OCS user (OCS RU). Once the OCS RU accepts the request, an acceptance message is sent back through the hub to the GTalk SU (at 1402). The acceptance message is again processed by a FS as illustrated in FIG. 6. Next, both the GTalk SU and the OCS RU connect to the FSS via TCP (at 1403 and 1409, respectively). TCP is the common protocol over which UC specific protocols such as TFTP and HTTP are implemented.

After GTalk SU connects successfully to the FSS, the FSS sends to the GTalk SU an HTTP GET to request the file (at 1410). In response, the GTalk SU sends an HTTP Response (at 1411). After OCS RU connects successfully to the FSS, the OCS RU sends to the FSS a signal indicating the protocol that will be used (e.g., VER MSN_SECURE_FTP) (at 1404). The FSS replies to the OCS RU with the same string indicating the protocol (at 1405).

The OCS RU sends a USR signal to the FSS for authentication (at 1406). If the USR signal is valid, the FSS sends back to the OCS RU a FIL signal that indicates the file size (at 1407). Next, the OCS RU sends a TFR signal to the FSS (at 1408). Next, the GTalk SU sends the file to the FSS while the FSS sends the file to the OCS RU (at 1412). Because the OCS RU knows the file size, the OCS RU knows when a file has finished transferring and sends a BYE signal to the FSS indicating a complete transfer (at 1413). Next, the FSS sends a MAC signature to the OCS RU to check the transfer (at 1414). Finally, the FSS closes the connection with the OCS RU (at 1415) and the GTalk SU closes the connection with the FSS (at 1316).

Local Domain Configurations

In order for UC systems to communicate with each other through a hub, the local domain administrators of the UC systems need to properly configure their systems so that communications traffic intended for a receiving UC system is directed to the hub. For instance, in a clearinghouse or hub implementation, a domain gateway is typically implemented. The domain gateway is a component that allows the UC system to communicate with the hub. In order for a UC system to communicate with the hub, both the domain gateway and the UC system need to be configured properly.

Figure 15:
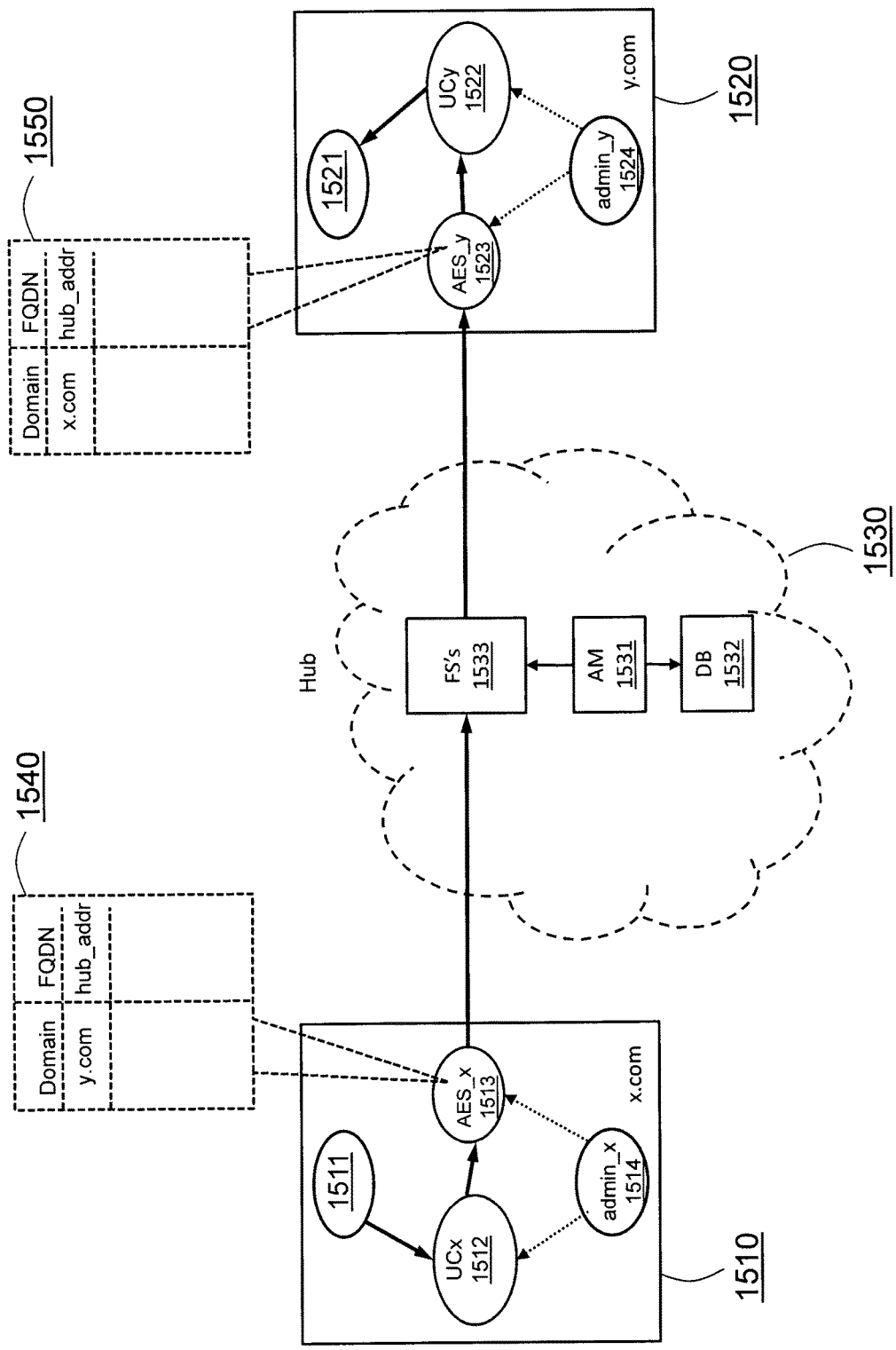
FIG. 15 illustrates a block diagram that traces an exemplary transmission of a message through a hub and domain gateways, according to one embodiment.

FIG. 15 illustrates a block diagram that traces an exemplary transmission of a message through a hub and domain gateways, according to one embodiment. Assume user 1511 wants to send a message to user 1521. User 1511 first sends the message to the local UC system 1512. The message is then forwarded to domain gateway 1513 (e.g., Access Edge Server (AES), Same Time Gateway, etc) which maintains an allow list 1540 of all the domains the local domain administrator 1514 has allowed its users to have access to. This way, local domain administrators have control over which domains its users can communicate with. Additionally, the allow list can be used allow or disallow communication with federated domains. Another useful function of the allow list is to provide UC address information for federated domains.

In order to route communications traffic that is intended for domain "y.com" (1520) to the hub 1530, the allow list 1540, specifically the FQDN field in the entry for domain "y.com" (1520), needs to include the address of the hub 1530 ("hub_addr"). Furthermore, the hub 1530 must also be properly configured by the hub administrator, who must add both domains ("x.com" and "y.com") to the hub 1530 through the AM 1531. Once the hub administrator has configured the AM 1531 and the AM 1531 has updated the data store in the DB 1532, the hub 1530 is ready for use and all traffic to and from "x.com" to "y.com" will flow through the hub 1530.

The routed traffic includes the message that was sent by 1511. After being processed by the hub 1530, the message is forwarded to domain gateway 1523, then to UC system 1522, and finally to user 1521. As FIG. 15 illustrates, the FQDN field in the entry for domain "x.com" in allow list 1550 also needs to include the address of the hub 1530 ("hub_addr"). As such, traffic intended for the domain "x.com" (1510) is also routed through the hub 1530.

Figure 16:
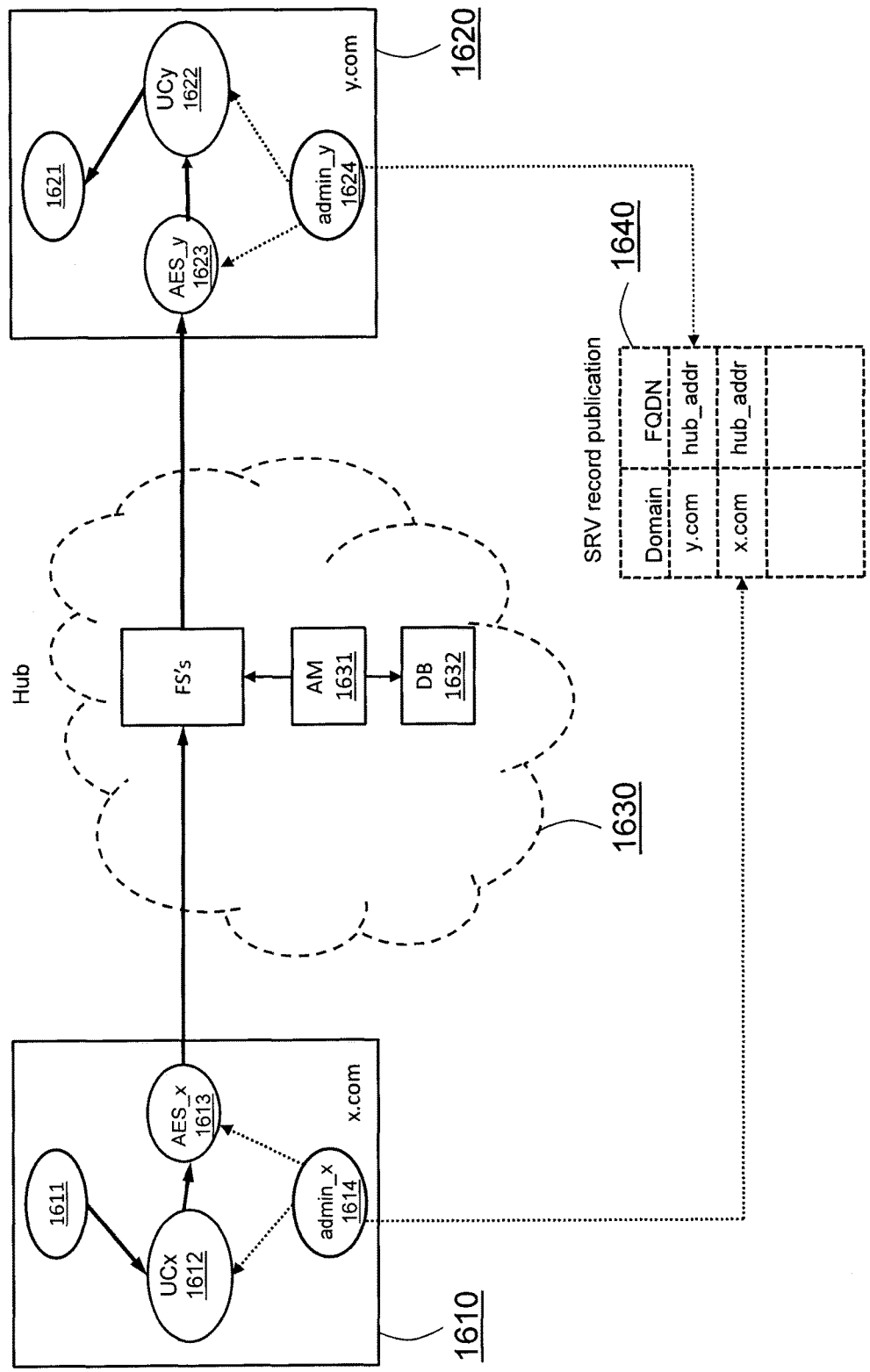
FIG. 16 illustrates a block diagram that traces an exemplary transmission of a message through a hub using service (SRV) record publication, according to one embodiment.

FIG. 16 illustrates a block diagram that traces an exemplary transmission of a message through a hub using SRV record publication, according to one embodiment. Assume user 1611 wants to send a message to user 1621. User 1611 first sends the message to the local UC system 1612. Next, the message is sent to domain gateway 1613 and is intended to be transmitted to domain "y.com" (1620). However, because the local administrators 1614 and 1624 have published the SRV records for domains "x.com" (1610) and "y.com" (1620), respectively, with the FQDN fields set as "hub_addr", as shown in SRV record publication 1640, all communications traffic that is intended for domains "x.com" and "y.com" 1620 will be routed to the hub 1630. In order for the hub 1630 to handle the routed traffic, both domains ("x.com" and "y.com") need to be added to the hub 1630 through the AM 1631. As FIG. 16 illustrates, the routed traffic includes the message that was sent by 1611. After being processed by the hub 1630, the message is forwarded to the domain gateway 1623, then to the UC system 1622, and finally to user 1621.

SRV records enable a domain (e.g., foo.com) to become part of the hub without asking other domains to configure their gateways/allow lists to add the domain in order to direct traffic to the hub. Accordingly, using SRV records for multiple protocols along with the support for those multiple protocols in the hub enable a domain (e.g., foo.com) to appear as different UC systems. For instance, by publishing an SRV record for the respective protocol, foo.com may appear as an OCS system to other OCS partners, and at the same time, foo.com may appear as a XMPP system to XMPP partners.

The SRV record requirement varies among UC systems based on the UC protocol used by the UC system or even within that UC protocol a vendor may have a specialized SRV record requirement. A feature of the hub is that the administrator of a domain (e.g., "y.com") can publish SRV records for all the UC system types that can federate (via the hub) with the domain (e.g., "y.com"). All these SRV records would point to the address for the hub (e.g., "hub.addr"). For instance, if "x.com" is an OCS UC system, then it would look up _sipfederationtls._tcp.y.com to federate with "y.com". If "z.com" is a Jabber UC system, then it would look up _xmpp-server._tcp.y.com to federate with "y.com." While "y.com" is a certain UC type (e.g., SAMETIME™) but because of the SRV record publication and the hub, "y.com" appears as an OCS UC system to "x.com" and as a Jabber UC system to "z.com".

Each of the features and teachings disclosed herein can be utilized separately or in conjunction with other features and teachings to provide a hub based clearing house for interoperability of distinct unified communications systems. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 17:
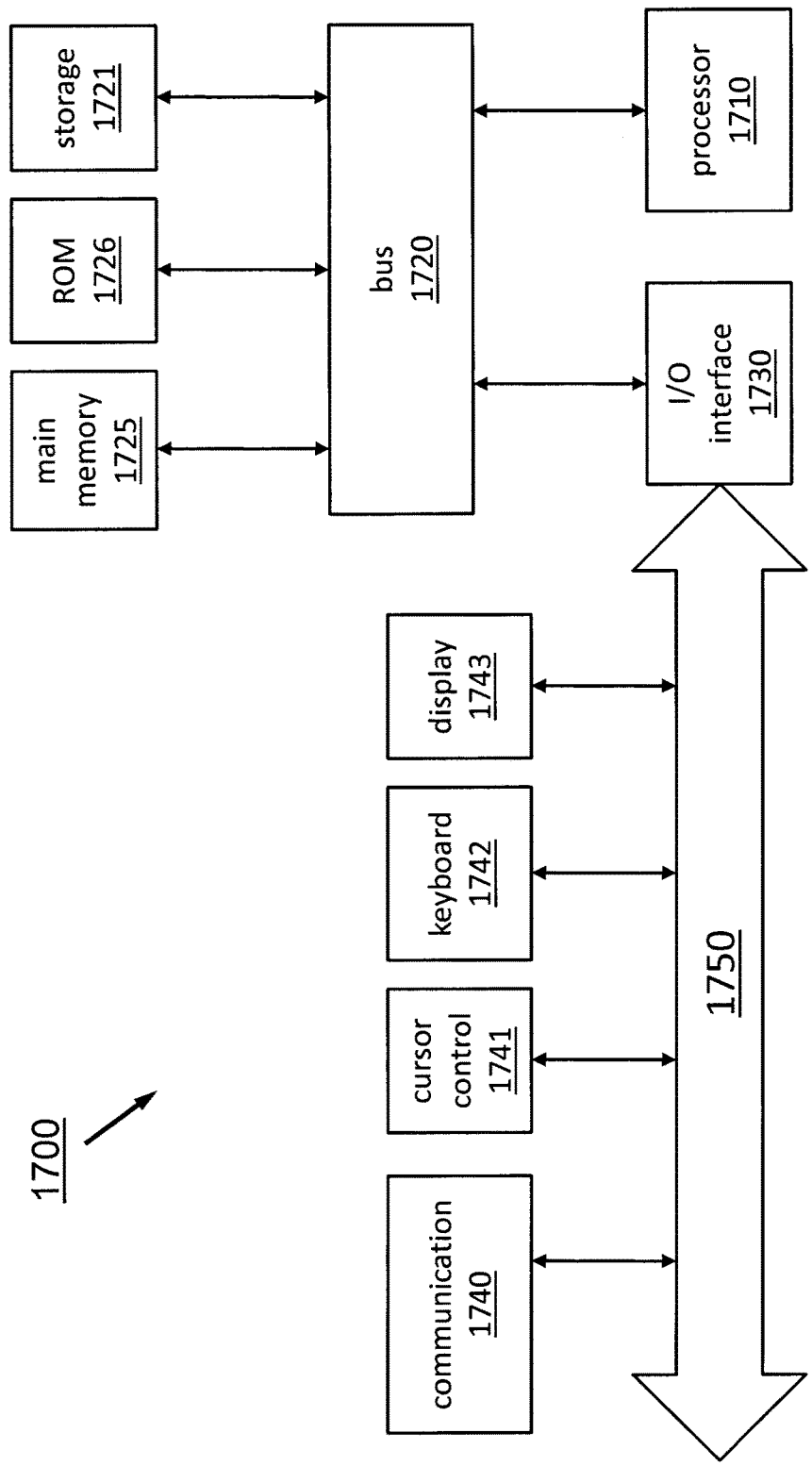
FIG. 17 illustrates an exemplary computer architecture that may be used for the present system, according to one embodiment.

FIG. 17 illustrates an exemplary computer architecture that may be used for the present system, according to one embodiment. The exemplary computer architecture may used for implementing one or more components described in the present disclosure including, but not limited to, a hub system, a load balancer, a database, an administrator module, a federation server, a user client, a relay server, a transcoder, a file sharing server, and a UC system. One embodiment of architecture 1700 comprises a system bus 1720 for communicating information, and a processor 1710 coupled to bus 1720 for processing information. Architecture 1700 further comprises a random access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Architecture 1700 may also include a read only memory (ROM) and/or other static storage device 1726 coupled to bus 1720 for storing static information and instructions used by processor 1710.

A data storage device 1725 such as a magnetic disk or optical disc and its corresponding drive may also be coupled to architecture 1700 for storing information and instructions. Architecture 1700 can also be coupled to a second I/O bus 1750 via an I/O interface 1730. A plurality of I/O devices may be coupled to I/O bus 1750, including a display device 1743, an input device (e.g., an alphanumeric input device 1742 and/or a cursor control device 1741).

The communication device 1740 allows for access to other computers (e.g., servers or clients) via a network. The communication device 1740 may comprise one or more modems, network interface cards, wireless network interfaces or other interface devices, such as those used for coupling to Ethernet, token ring, or other types of networks.

A hub-based clearing house for interoperability of distinct unified communication systems is disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A system, comprising:
a federation server that includes a processor and a memory and is connected to a first domain and a second domain, the federation server comprising,
a translator that translates a first formatted message received from the first domain into a second formatted message, and
a routing engine that routes the second formatted message to the second domain,
wherein the federation server allows the first domain that runs a first type of unified communications application to appear as running a second type of unified communications application,
wherein the second domain runs the second type of unified communications application,
wherein the first domain includes a first unified communications system running the first type of unified communications application, which provides integrated communications services, the integrated communication services including instant messaging (IM), presence notifications, telephony, video conferencing, email, SMS, and voicemail, and
wherein the federation server allows the first domain that runs a first type of unified communications application to appear as running a second type of unified communications application that federates with the second domain based on a published service (SRV) record.

2. The system of claim 1, wherein the translator translates the first formatted message into a common language formatted message and translates the common language formatted message into the second formatted message.

3. The system of claim 2, wherein the common language formatted message contains at least one field in the first formatted message.

4. The system of claim 2, wherein the common language formatted message contains at least one field in the second formatted message.

5. The system of claim 2, wherein the format of the common language formatted message is generic Session Initiation Protocol (SIP).

6. The system of claim 1, further comprising a database that stores configuration information for the system.

7. The system of claim 6, further comprising an administrator module that maintains the configuration information.

8. The system of claim 6, wherein the database is a relational database.

9. The system of claim 7, wherein the administrator module sets enforcement policies for determining whether messages received by the federation server are acceptable.

10. The system of claim 7, wherein only the administration module has direct access to the database.

11. The system of claim 9, wherein the federation server further comprises a policy enforcement engine that applies the enforcement policies to the first formatted message.

12. The system of claim 1, further comprising load balancers that manage and direct communications traffic to the federation server to make efficient use of available system resources.

13. The system of claim 1, further comprising a relay server that relays real-time media communications traffic between the first domain and the second domain.

14. The system of claim 1, further comprising a transcoder that transcodes real-time media communications traffic between the first domain and the second domain.

15. The system of claim 1, further comprising a file sharing server that relays file transfer data between the first domain and the second domain using dissimilar file transfer protocols.

16. The system of claim 1, wherein the federation server is connected to the first domain through a first connector and is connected to the second domain through one of the first connector and through a second connector.

17. The system of claim 16, wherein each of the first connector and the second connector is configured to connect to multiple unified communications (UC) systems.

18. A method, comprising:
connecting a first domain and a second domain through a federation server;
receiving into the federation server a first formatted message from the first domain;
translating the first formatted message into a second formatted message; and
routing the second formatted message from the federation server to the second domain, wherein the federation server allows the first domain that runs a first type of unified communications application to appear as running a second type of unified communications application, wherein the second domain runs the second type of unified communications application,
wherein the first domain includes a first unified communications system running the first type of unified communications application, which provides integrated communications services, the integrated communication services including instant messaging (IM), presence notifications, telephony, video conferencing, email, SMS, and voicemail, and
wherein the federation server allows the first domain that runs a first type of unified communications application to appear as running a second type of unified communications application that federates with the second domain based on a published service (SRV) record.

19. The method of claim 18, further comprising translating the first formatted message into a common language formatted message and translating the common language formatted message into the second formatted message.

20. The method of claim 19, wherein the common language formatted message contains at least one field in the first formatted message.

21. The method of claim 19, wherein the common language formatted message contains at least one field in the second formatted message.

22. The method of claim 19, wherein the format of the common language formatted message is generic Session Initiation Protocol (SIP).

23. The method of claim 18, further comprising setting enforcement policies for determining whether messages received by the federation server are acceptable.

24. The method of claim 23, further comprising applying the enforcement policies to the first formatted message.

25. The method of claim 18, wherein publishing the SRV record directs the first formatted message to the federation server.

* * * * *